United States Patent
Konishi et al.

(10) Patent No.: US 9,445,478 B2
(45) Date of Patent: Sep. 13, 2016

(54) LIGHT-EMITTING ELEMENT LIGHTING DEVICE, LIGHT-EMITTING MODULE, ILLUMINATING APPARATUS, AND LIGHT-EMITTING ELEMENT LIGHTING METHOD

(71) Applicant: Panasonic Corporation, Osaka (JP)

(72) Inventors: Hirofumi Konishi, Osaka (JP); Masanao Okawa, Nara (JP); Yohei Hayashi, Osaka (JP); Itaru Onishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/334,045

(22) Filed: Jul. 17, 2014

(65) Prior Publication Data
US 2015/0028772 A1  Jan. 29, 2015

(30) Foreign Application Priority Data
Jul. 26, 2013  (JP) .................................. 2013-156116

(51) Int. Cl.
*H05B 33/08* (2006.01)

(52) U.S. Cl.
CPC ...... *H05B 33/0896* (2013.01); *H05B 33/0815* (2013.01)

(58) Field of Classification Search
CPC .......... H05B 33/0896; H05B 33/0815; H05B 33/0827; H05B 37/029
USPC ....................................................... 315/297
See application file for complete search history.

(56) References Cited

U.S. PATENT DOCUMENTS

| 7,108,392 | B2 | 9/2006 | Strip et al. | |
| 7,250,810 | B1* | 7/2007 | Tsen | H02M 3/07 315/291 |
| 7,528,553 | B2 | 5/2009 | Ito et al. | |
| 2005/0248935 | A1* | 11/2005 | Strip et al. | 362/145 |
| 2007/0170876 | A1* | 7/2007 | Ito et al. | 315/312 |
| 2012/0217899 | A1* | 8/2012 | Iwai | H05B 33/089 315/297 |
| 2012/0262082 | A1* | 10/2012 | Esaki et al. | 315/224 |
| 2014/0139227 | A1* | 5/2014 | Iwakiri | 324/414 |

(Continued)

FOREIGN PATENT DOCUMENTS

| JP | 2007-200610 A | 8/2007 |
| JP | 2007-536708 A | 12/2007 |

(Continued)

*Primary Examiner* — Dylan White
(74) *Attorney, Agent, or Firm* — Renner, Otto, Boisselle & Sklar, LLP

(57) ABSTRACT

A light-emitting element lighting device includes: a step-down chopper circuit which outputs a current that flows to a light-emitting element; a current command circuit which selects between a rated mode for passing a rated current for turning ON the light-emitting element and a detection mode for passing an abnormality detection current, which is smaller than the rated current, for detecting an abnormality in the light-emitting element; a voltage detection circuit which detects a voltage across both ends of the light-emitting element; and a control circuit which causes the step-down chopper circuit to stop outputting the current to the light-emitting element, when the voltage across both ends detected by the voltage detection circuit in the detection mode is lower than or equal to an abnormality detection threshold voltage which is set lower than the rated voltage at the time when the light-emitting element is turned ON.

17 Claims, 16 Drawing Sheets

(56) References Cited

U.S. PATENT DOCUMENTS

| | | | |
|---|---|---|---|
| 2014/0232268 A1* | 8/2014 | Kamoi et al. | 315/117 |
| 2014/0252950 A1* | 9/2014 | Kikuchi et al. | 315/77 |
| 2014/0300274 A1* | 10/2014 | Acatrinei | 315/85 |
| 2015/0015143 A1* | 1/2015 | Inada | 315/77 |
| 2015/0028774 A1* | 1/2015 | Konishi et al. | 315/302 |

FOREIGN PATENT DOCUMENTS

| | | |
|---|---|---|
| JP | 2011-204625 A | 10/2011 |
| JP | 2011-222341 A | 11/2011 |
| JP | 2012-048984 A | 3/2012 |
| WO | WO 2005/107411 A2 | 11/2005 |

* cited by examiner

LIGHT-EMITTING ELEMENT LIGHTING DEVICE, LIGHT-EMITTING MODULE, ILLUMINATING APPARATUS, AND LIGHT-EMITTING ELEMENT LIGHTING METHOD

CROSS REFERENCE TO RELATED APPLICATION

This application claims the benefit of priority of Japanese Patent Application No. 2013-156116 filed Jul. 26, 2013, the entire content of which is hereby incorporated by reference.

TECHNICAL FIELD

The disclosure relates to a lighting device which turns ON a light-emitting element such as a light-emitting diode (LED) and so on, a light-emitting module, an illuminating apparatus including the lighting device and the light-emitting module, and a light-emitting element lighting method.

BACKGROUND ART

Recent years have seen the growing popularity of illuminating apparatuses using light-emitting modules including light-emitting elements such as light-emitting diodes (LED) as substitutes for incandescent lamps.

Patent Literature (PTL) 1 (Japanese Unexamined Patent Application Publication No. 2007-536708) discloses an illuminating apparatus to which plural flat panel light sources are electrically connected.

FIG. 17 is an outline configuration diagram of a conventional light-emitting unit apparatus disclosed in PTL 1. The figure illustrates a light-emitting unit apparatus which includes: plural light-emitting units 905; and communication lines connected to the light-emitting units 905, for communicating control signals. The respective light-emitting units 905 have plural electrical contacts for the supply of power and, by being electrically connected to each other, are able to supply power to adjacent light-emitting units 905. Furthermore, PTL 1 discloses that each light-emitting unit 905 includes a control device and, through signal communication between adjacent control devices, plural light-emitting units 905 can operate in conjunction with one other. Furthermore, each light-emitting unit 905 is controlled so that a constant current flows to the light-emitting element in order to produce a constant luminance.

SUMMARY

Since individual light-emitting modules, including the light-emitting units in PTL 1, typically produce a constant luminance, a configuration which detects a light-emitting element having a short-circuit abnormality (also referred to here as a short-circuited abnormal (light-emitting) element) is adopted.

In particular, among light-emitting elements, organic electroluminescence (EL) light-emitting elements are configured of organic EL thin-film material having a thickness ranging from tens of nanometers to hundreds of nanometers, and thus the presence of foreign matter and impurities in materials, and so on, during manufacturing significantly affects the operating life of a module. A short-circuit fault in an organic EL light-emitting element occurs due to the presence of conductive foreign matter in a light-emitting layer between a positive electrode and a negative electrode. Therefore, when the voltage obtained when a rated current is passed through an organic EL light-emitting element is lower than a threshold voltage, it can be concluded that current is accumulating in the conductive foreign matter, and thus it can be judged that a short-circuit abnormality has occurred in the element.

Here, in order to avoid normal components being erroneously detected, consideration is given to temperature characteristics-induced variation from the rated voltage that is supposed to be generated when the rated current is passed, and the aforementioned threshold voltage is typically set with a predetermined margin from the rated voltage. On the other hand, there are various states of short-circuit abnormality such as full conductivity and unstable conductivity due to point contact, and there is a large variation in the voltage generated when the rated current is passed. With this, there is the problem that, even when the rated current is passed, a short-circuited abnormal element cannot be accurately detected using the set threshold voltage.

The present invention is conceived in view of the aforementioned problem and has as an object to provide a light-emitting element lighting device, a light-emitting module, an illuminating apparatus, and a light-emitting element lighting method which accurately detect a short-circuit abnormality in an organic EL light-emitting element which is turned ON with a rated current, and take appropriate measures.

In order to achieve the aforementioned object, a light-emitting element lighting device according to an aspect of the present invention is a light-emitting element lighting device which turns ON an organic electroluminescence (organic EL) light-emitting element, and includes: a current generation unit configured to output a current that flows to the organic EL light-emitting element; a mode selection unit configured to select between (i) a rated mode for passing a rated current for turning ON the organic EL light-emitting element and (ii) a detection mode for passing an abnormality detection current, which is smaller than the rated current, for detecting an abnormality in the organic EL light-emitting element; a voltage detection unit configured to detect a voltage across both ends of the organic EL light-emitting element; and a current control unit configured to cause the current generation unit to stop outputting the current to the organic EL light-emitting element, when the voltage across both ends detected by the voltage detection unit in the detection mode is lower than or equal to an abnormality detection threshold voltage which is set lower than the rated voltage at the time when the organic EL light-emitting element is turned ON.

Furthermore, in a light-emitting element lighting device according to another aspect of the present invention, the abnormality detection threshold voltage is set to be lower than or equal to a light emission start voltage at which the organic EL light-emitting element starts to emit light.

Furthermore, in a light-emitting element lighting device according to another aspect of the present invention, the mode selection unit is configured to select the detection mode at least once in a period in which the organic EL light-emitting element is continuously turned ON.

Furthermore, in a light-emitting element lighting device according to another aspect of the present invention, the mode selection unit is configured to select the detection mode for a predetermined period, immediately after power supply is provided.

Furthermore, a light-emitting element lighting device according to another aspect of the present invention further includes a lighting signal receiving unit configured to receive a lighting signal from an outside source. Here, the mode selection unit is configured to select the detection mode for a predetermined period, immediately after the lighting signal received by the lighting signal receiving unit is inputted.

Furthermore, in a light-emitting element lighting device according to another aspect of the present invention, the mode selection unit is configured to select the rated mode and the detection mode alternately.

Furthermore, in a light-emitting element lighting device according to another aspect of the present invention, the mode selection unit is configured to select the rated mode and the detection mode alternately immediately after power supply is provided, and determine periods for the rated mode and the detection mode with which the organic EL light-emitting element emits light at a predetermined luminance.

Furthermore, in a light-emitting element lighting device according to another aspect of the present invention, the mode selection unit is configured to select the rated mode and the detection mode alternately immediately after a lighting signal is inputted from an outside source, and determine periods for the rated mode and the detection mode with which the organic EL light-emitting element emits light at a predetermined luminance.

Furthermore, in a light-emitting element lighting device according to another aspect of the present invention, the mode selection unit is configured to select the detection mode when the voltage across both ends in the rated mode is lower than or equal to a predetermined voltage which is lower than the rated voltage.

Furthermore, in a light-emitting element lighting device according to another aspect of the present invention, the mode selection unit is configured to select the rated mode and the detection mode alternately when the voltage across both ends in the rated mode is lower than or equal to a predetermined voltage which is lower than the rated voltage.

Furthermore, in a light-emitting element lighting device according to another aspect of the present invention, the current control unit is configured to cause the current generation unit to stop outputting a current to a light-emitting module which includes the organic EL light-emitting element singularly or in a plurality connected in series, when, in the detection mode which is set in a transient period in which a current transitions from a current smaller than the rated current to the rated current, a voltage across both ends of the light-emitting module which is detected at a predetermined time in the transient period is lower than or equal to the abnormality detection threshold voltage which is set lower than a sum rated voltage which is a sum of rated voltages at the time when organic EL light-emitting elements included in the light-emitting module are turned ON.

Furthermore, in a light-emitting element lighting device according to another aspect of the present invention, the mode selection unit is configured to select the detection mode at least once in a period in which the light-emitting module is continuously turned ON.

Furthermore, in a light-emitting element lighting device according to another aspect of the present invention, the mode selection unit is configured to select the detection period for a predetermined period, immediately after power supply is provided.

Furthermore, in a light-emitting element lighting device according to another aspect of the present invention, the current control unit is configured to shorten a period from a start time of the transient period up to the predetermined time, as the number of the organic EL light-emitting elements included in the light-emitting module is higher.

Furthermore, in a light-emitting element lighting device according to another aspect of the present invention, the current control unit is configured to set the abnormality detection threshold voltage higher as the number of the organic EL light-emitting elements included in the light-emitting module is higher.

Furthermore, a light-emitting module according to an aspect of the present invention includes: an organic EL light-emitting element; and any one of above-described light-emitting element lighting devices.

Furthermore, an illuminating apparatus according to an aspect of the present invention includes a plurality of the above-described light-emitting modules.

Furthermore, the present invention can be implemented not only as a light-emitting element lighting device, light-emitting module, and illuminating apparatus which include such characteristic components, but also as a method of lighting a light-emitting element.

According to the light-emitting element lighting device according to an aspect of the present invention, the current control unit judges short-circuit abnormality according to whether or not the voltage of the light-emitting element, which is detected when the abnormality detection current which is lower than the rated current is passed, is lower than or equal to the abnormality detection threshold voltage which is set lower than the rated voltage. Therefore, compared to the case where short-circuit abnormality is judged according to the voltage of the light-emitting element detected when the rated current is passed, it is possible to clearly distinguish between the voltage of a normal light-emitting element and the voltage of a short-circuited abnormal light-emitting element, and thus a short-circuit abnormality can be detected with high accuracy. Furthermore, current output to a short-circuited abnormal element can be reliably stopped.

BRIEF DESCRIPTION OF THE DRAWINGS

The figures depict one or more implementations in accordance with the present teaching, by way of examples only, not by way of limitations. In the figures, like reference numerals refer to the same or similar elements.

FIG. 12 is a timing chart for light-emission current and light-emission voltage when an abnormality detection method according to Embodiment 4 is used while a light-emitting element is turned ON.

DETAILED DESCRIPTION

Hereinafter, light-emitting element lighting devices, light-emitting modules, illuminating apparatuses, and light-emitting element lighting methods according to exemplary embodiments of the present invention shall be described with reference to the Drawings. It should be noted that each of the subsequently-described embodiments show a specific preferred example of the present invention. Therefore, numerical values, shapes, materials, structural components, the arrangement and connection of the structural components, etc. shown in the following exemplary embodiments are mere examples, and are not intended to limit the scope of the present invention. Furthermore, among the structural components in the following exemplary embodiment, components not recited in any one of the independent claims which indicate the broadest concepts of the present invention are described as arbitrary structural components.

Embodiment 1

Hereinafter, a light-emitting element lighting device according to Embodiment 1 shall be described with reference to the Drawings.

(Configuration)

Figure 1:
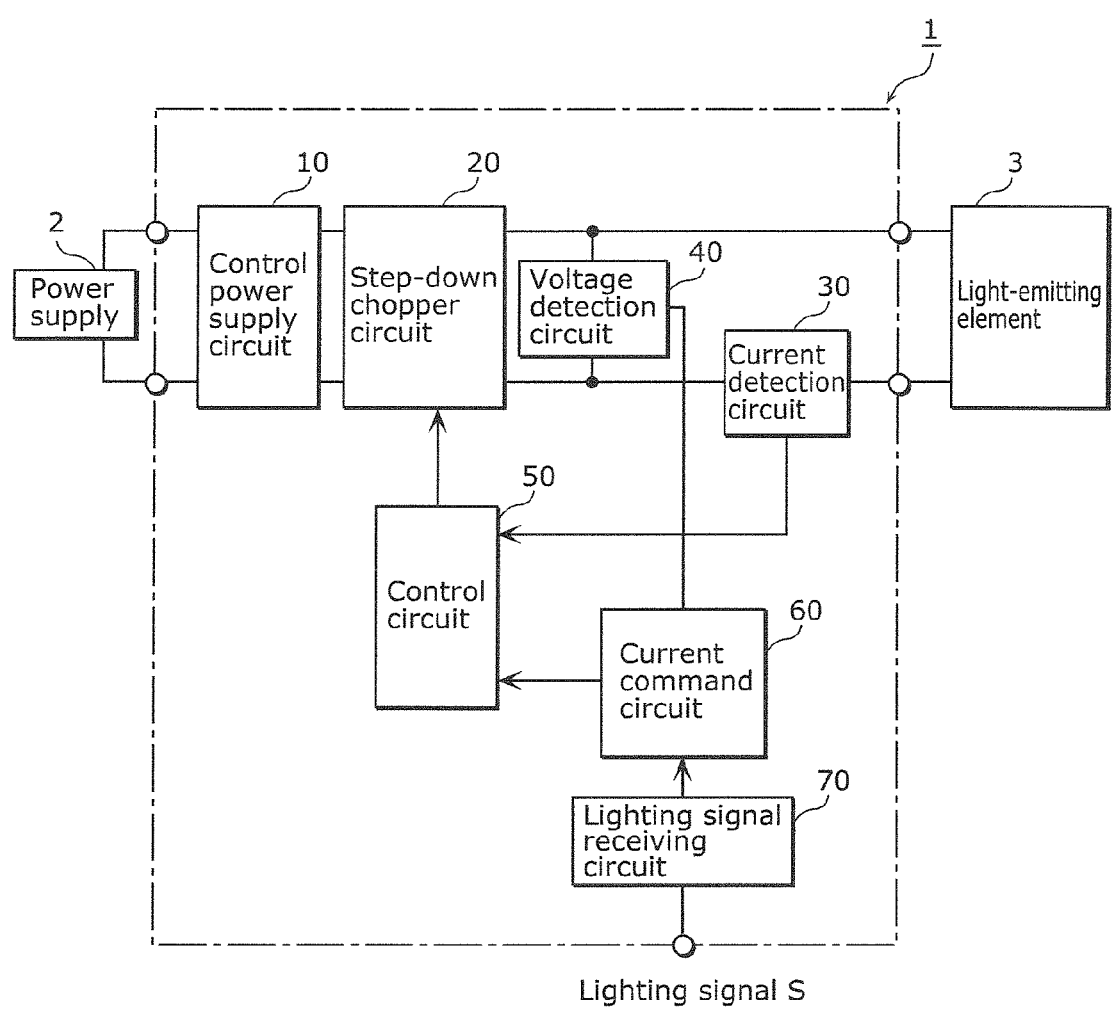
FIG. 1 is a block configuration diagram of a light-emitting element lighting system according to Embodiment 1.

FIG. 1 is a block configuration diagram of a light-emitting element lighting system according to Embodiment 1. The light-emitting element lighting system illustrated in the figure includes a light-emitting element lighting device 1, a power supply 2, and a light-emitting element 3. Furthermore, the light-emitting element lighting device 1 includes a control power supply circuit 10, a step-down chopper circuit 20, a current detection circuit 30, a voltage detection circuit 40, a control circuit 50, a current command circuit 60, and a lighting signal receiving circuit 70.

The power supply 2 supplies, for example, direct current (DC) voltage obtained through rectification and smoothing of commercial alternating current (AC) by a boost chopper circuit to the light-emitting element lighting device 1.

The light-emitting element 3 is a light-emitting element such as an LED, and is, for example, an organic EL light-emitting element. An organic EL light-emitting element, for example, has a structure in which a lower transparent electrode, a light-emitting layer, and an upper electrode are stacked above a substrate. The light-emitting layer is includes a hole injection layer, a hole transport layer, an organic light-emitting layer, an electron injection layer, and so on. In the case where the aforementioned structure is, for example, a bottom emission structure, when voltage is applied between the lower transparent electrode and the upper electrode, holes and electrons are injected into the organic light-emitting layer and recombine to thereby generate an excited state in which light is created. Then, the light is emitted to the substrate side via the lower transparent electrode. Furthermore, of the light created in the light-emitting layer, light directed upward is reflected off the upper electrode and emitted to the substrate side via the lower transparent electrode.

When conductive foreign matter is present in the light-emitting layer between both electrodes of the organic EL light-emitting element having the above-described configuration, both electrodes are short-circuited via the foreign matter, and thus the current that should flow to the light-emitting layer is concentrated in the conductive foreign matter. This causes luminance deterioration or non-light emission of the organic EL light-emitting element.

Next, the respective structural components of the light-emitting element lighting device 1 shall be described.

The control power supply circuit 10 supplies the power supply voltage of the control circuit 50.

The step-down chopper circuit 20 converts the power supplied from the power supply 2 into the DC power required by the light-emitting element 3, according to a control signal from the control circuit 50. The step-down chopper circuit 20 is a current generation unit which outputs current flowing to the light-emitting element 3.

The current detection circuit 30 detects the current flowing in the light-emitting element 3.

The voltage detection circuit 40 is a voltage detecting unit which detects the potential difference between the positive electrode and the negative electrode (voltage across both ends) of the light-emitting element 3.

The current command circuit 60 determines the mode of the current to be supplied to the light-emitting element 3, based on the voltage across both ends of the light-emitting element 3 detected by the voltage detection circuit 40 and a lighting signal S outputted from the lighting signal receiving circuit 70. Specifically, the current command circuit 60 is a mode selecting unit which selects (i) a rated mode for passing a rated current for turning ON the light-emitting element 3 or (ii) a detection mode for passing an abnormality detection current which is smaller than the rated current, for detecting an abnormality in the light-emitting element 3.

The control circuit 50 generates a control signal based on the current value detected by the current detection circuit 30 and the mode selection signal from the current command circuit 60, and outputs the control signal to the step-down chopper circuit 20. Specifically, the control circuit 50 is a current control unit which causes the step-down chopper circuit 20 to stop current output to the light-emitting element 3, in the case where the voltage across both ends of the light-emitting element 3 detected by the voltage detection circuit 40 in the detection mode is lower than or equal to the abnormality detection threshold voltage which is set lower than the rated voltage at the time when the light-emitting element 3 is turned ON.

Figure 2:
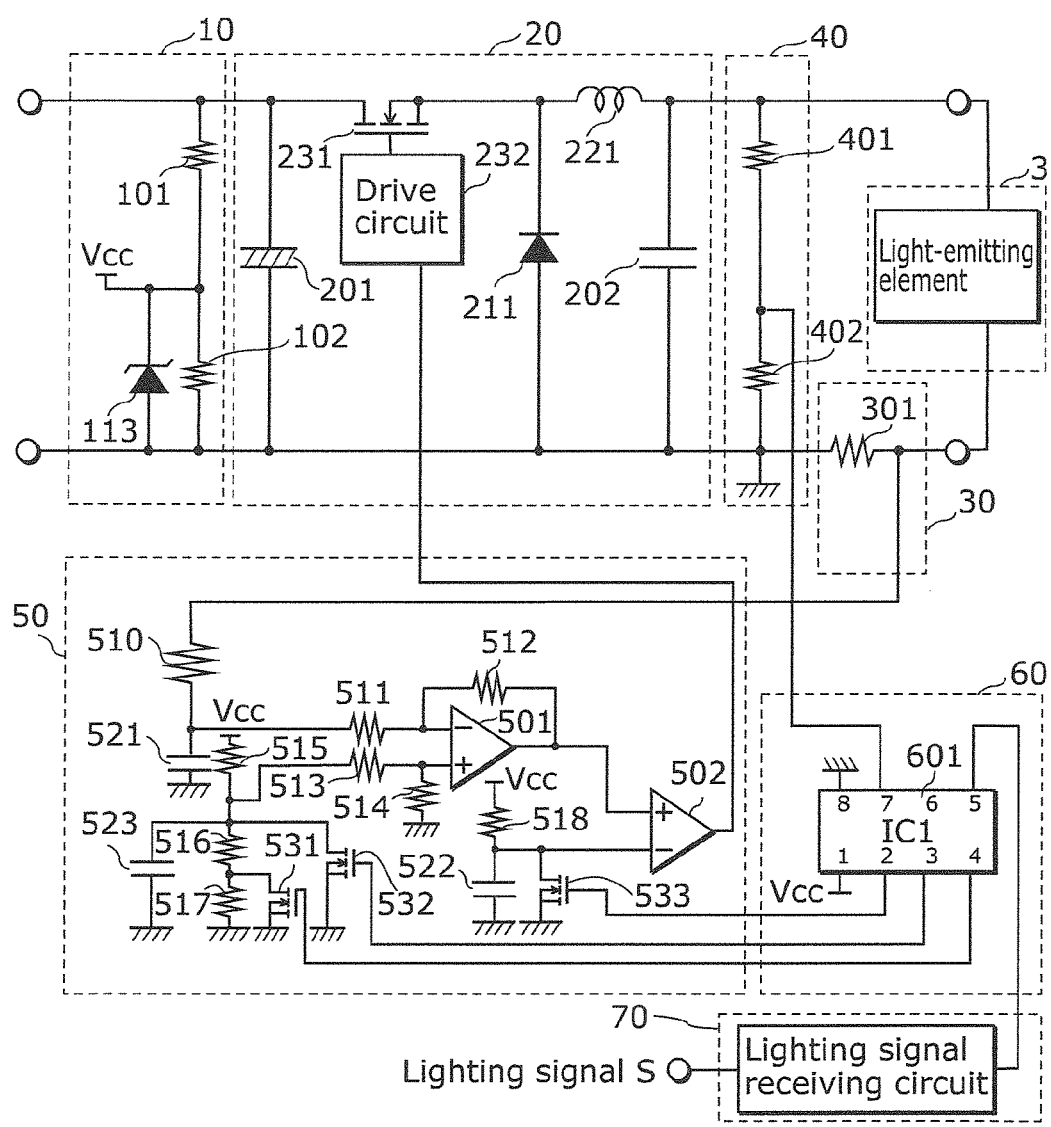
FIG. 2 is a diagram illustrating an example of a circuit configuration of a light-emitting element lighting system according to Embodiment 1.

FIG. 2 is a diagram illustrating an example of a circuit configuration of a light-emitting element lighting system according to Embodiment 1.

In the control power supply circuit 10, a resistive element 101 and a resistive element 102 are connected in series between a positive electrode terminal and a negative electrode terminal. Furthermore, a Zener diode 113 is connected in parallel with the resistive element 102. With this circuit configuration, the voltage that is applied between the positive electrode terminal and the negative electrode terminal is divided between the resistive element 101 and the resistive element 102, and becomes a power supply voltage Vcc of the control circuit 50. Furthermore, with the Zener diode 113, it is possible to prevent the power supply voltage Vcc from exceeding a predetermined voltage.

The step-down chopper circuit 20 includes an electrolytic capacitor 201, a switching element 231, a regeneration diode 211, an inductor 221, and a capacitor 202. DC voltage supplied from the power supply 2 is applied to the capacitor 201 which functions as a DC power supply. It should be noted that the power supply 2 may be a battery, a DC power supply, or the like. The step-down chopper circuit 20 converts the DC power accumulated in the electrolytic capacitor 201 into the power required by the light-emitting element 3, by way of the switching element 231 switching at a high frequency. The DC voltage of the electrolytic capacitor 201, that is, the DC voltage of the power supply 2 is maintained constant at, for example, 24 V which is the voltage across both ends required to keep the light-emitting element 3, which is composed of an organic EL light-emitting element, turned ON. It should be noted that, in the case of an organic EL light-emitting element which requires about 5 V to 10 V for light-emitting operation, the aforementioned DC voltage may be approximately 12 V. Furthermore, in the case where 10 organic EL elements each requiring about 5 V to 10 V for light-emitting operation are connected in series, a voltage of approximately 50 V to 100 V is required.

The current command circuit 60 determines the value of the current to be passed to the light-emitting element 3 as well as the duty ratio of the current to be passed to the light-emitting element 3. A general-purpose microcomputer 601 is a flash memory-equipped 8-bit microcomputer having an analog-to-digital (A/D) conversion function. The general-purpose microcomputer 601 detects the voltage across both ends of the light-emitting element 3 by monitoring (no. 7 pin) the voltage division point between a resistive element 401 and a resistive element 402, and judges whether or not to change the current of the light-emitting element 3 according to the detection result. In addition, the general-purpose microcomputer 601 performs turn-ON judgment and load abnormality detection. As such, the no. 7 pin is set as the A/D conversion input and reads the value of the voltage across both ends of the light-emitting element 3 which corresponds to the voltage across both ends of the capacitor 202. Furthermore, no. 2, no. 3, and no. 4 pins are set to the binary outputs. A no. 1 pin is a power supply terminal and a no. 8 pin is a ground terminal.

The control circuit 50 causes the desired power to be supplied to the light-emitting element 3 by controlling the switching element 231 of the step-down chopper circuit 20. The control circuit 50 detects the current value of the light-emitting element 3 using a current detection resistor 301, and adjusts the current value using an error amplifier 501. Specifically, by comparing the output voltage of the error amplifier 501 and a triangular wave signal of a minus terminal of a comparator 502, the control circuit 50 adjusts the ON-OFF operation of the switching element 231 of the step-down chopper circuit 20 to adjust the power supplied to the light-emitting element 3. The operation for generating a drive signal for the switching element 231 performed by the comparator 502 shall be described below using FIG. 3.

As described above, the current command circuit 60 is a mode selection unit which selects a rated mode or a detection mode, and, together with the control circuit 50, makes up a current control unit which controls current output to the light-emitting element 3 using the voltage across both ends of the light-emitting element 3.

Figure 3:
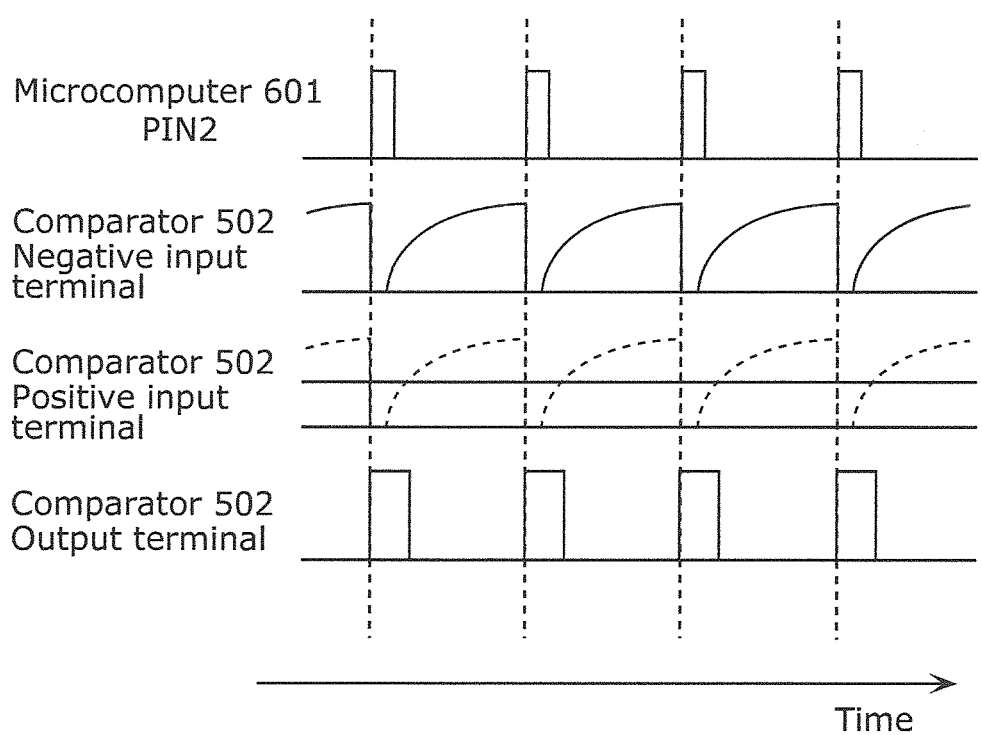
FIG. 3 is a timing chart for describing the operation of a control circuit according to Embodiment 1.

FIG. 3 is a timing chart for describing the operation of a control circuit according to Embodiment 1. The timing chart illustrated in the figure shows, from the top, the output voltage of the no. 2 pin of the general-purpose microcomputer 601, the voltage of a capacitor 522 which is applied to a negative input terminal of the comparator 502, the reference voltage applied to a positive input terminal of the comparator 502 (broken lines indicate the voltage of the capacitor 522), and the output terminal voltage of the comparator 502. It should be noted that the comparator 502 and the error amplifier 501 can be inexpensively configured using an integrated circuit provided with two operational amplifiers in a single package, and the control power supply thereof is supplied from the power supply voltage Vcc.

When the no. 2 pin of the general-purpose microcomputer 601 is at the H (high) level, the turning ON of a switching element 533 causes the capacitor 522 to become short-circuited and the charge accumulated therein to be discharged. On the other hand, when the no. 2 pin of the general-purpose microcomputer 601 is at the L (low) level, the turning OFF of the switching element 533 causes the capacitor 522 to be charged via a resistive element 518 and thus the voltage of the capacitor 522 rises. The voltage of the capacitor 522 is applied to the negative input terminal of the comparator 502. The output voltage of the error amplifier 501 is applied, as a reference voltage, to the positive input terminal of the comparator 502. In a period in which the voltage of the capacitor 522 is lower than the reference voltage, the output of the comparator 502 is at the H level. Therefore, the switching element 231 is driven ON or OFF according to the high-frequency signal outputted from the no. 2 pin of the general-purpose microcomputer 601, and the pulse width of the high-frequency signal increases as the output voltage of the error amplifier 501 rises. Therefore, by changing the reference voltage of the positive input terminal of the error amplifier 501, it is possible to adjust the current value of the light-emitting element 3.

Factors for changing the reference voltage inputted to the positive input terminal of the error amplifier 501 shall be described below. The switching element 531 turns ON or OFF according to the frequency of the output signal from the no. 4 pin of the general-purpose microcomputer 601. The voltage value of the capacitor 523 can be adjusted by changing the percentage of the time that the switching element 531 is ON (charging: Vcc to resistive element 515 to capacitor 523; discharge: capacitor 523 to resistive element 516 to switching element 531). With this, it becomes possible to change the reference voltage of the positive input terminal of the error amplifier 501 to adjust the current of the light-emitting element 3.

Furthermore, in the case of intermittently passing DC current to the light-emitting element 3 (referred to as PWM control), the output of the no. 3 pin of the general-purpose microcomputer 601 is switched ON/OFF according to arbitrary frequencies, and the effective value of the light-emitting element current is controlled by changing the percentage of the time that the output is ON. The no. 3 pin of the general-purpose microcomputer 601 is connected to the gate of the switching element 532.

The lighting signal receiving circuit 70 receives a lighting signal S from an outside source and performs level adjustment to allow inputting to the general-purpose microcomputer 601, and outputs the signal to the no. 5 pin of the general-purpose microcomputer 601. The lighting signal S is a 1 kHz PWM signal, and turning ON, turning OFF, and dimming are determined according to a high voltage (Vcc) and a low voltage (0 V). Furthermore, when the general-purpose microcomputer 601 has an A/D conversion function, performing D/A conversion using the lighting signal receiving circuit 70 and inputting the result to the general-purpose microcomputer 601 allows turning ON, turning OFF, and dimming to be determined in the general-purpose microcomputer 601 by using an analog value.

(Lighting Operation)

Figure 4:
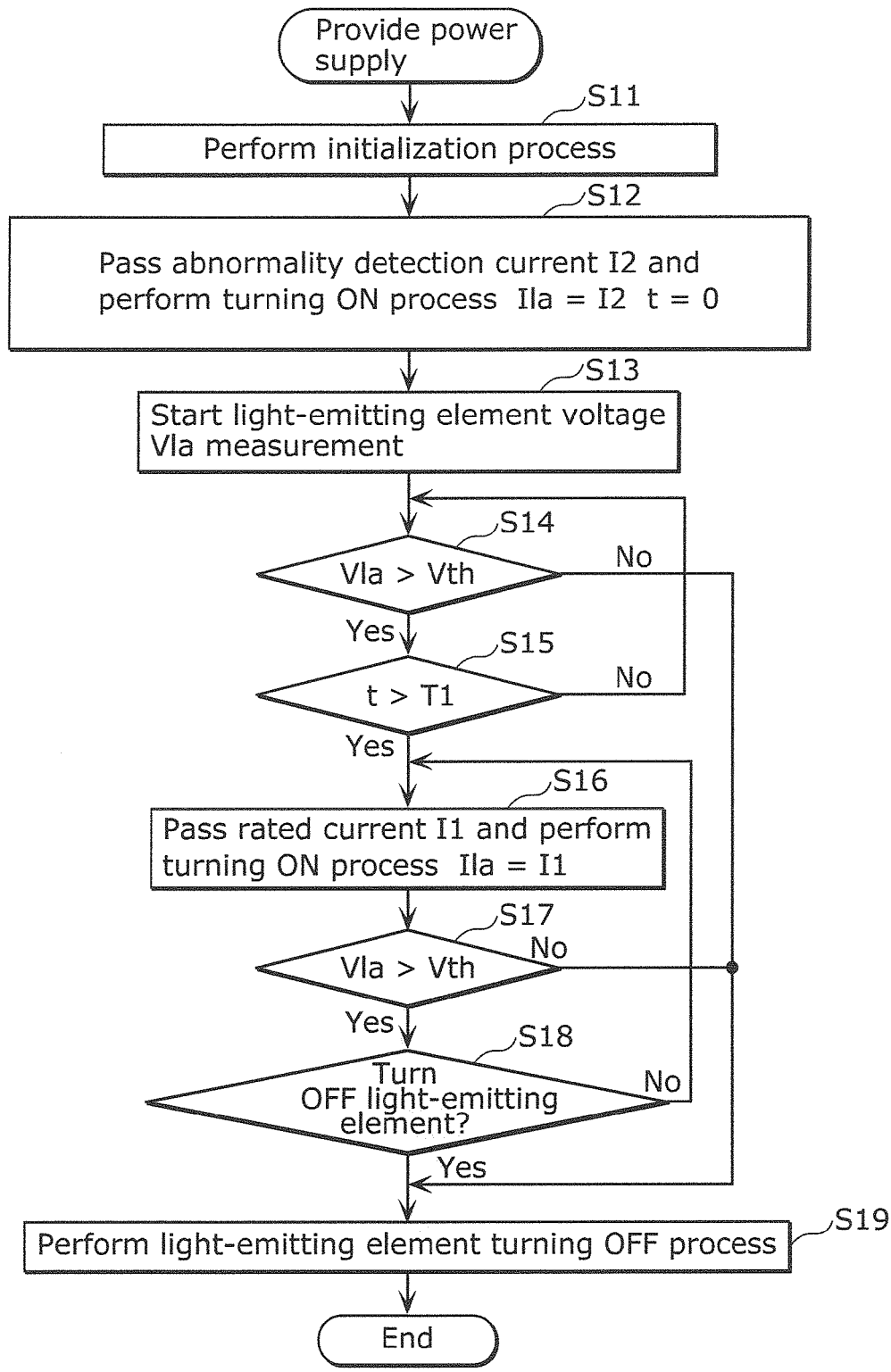
FIG. 4 is an operation flowchart for describing a light-emitting element lighting method according to Embodiment 1.

Next, the lighting operation of the light-emitting element lighting device according to this embodiment shall be described using FIG. 4.

Figure 5:
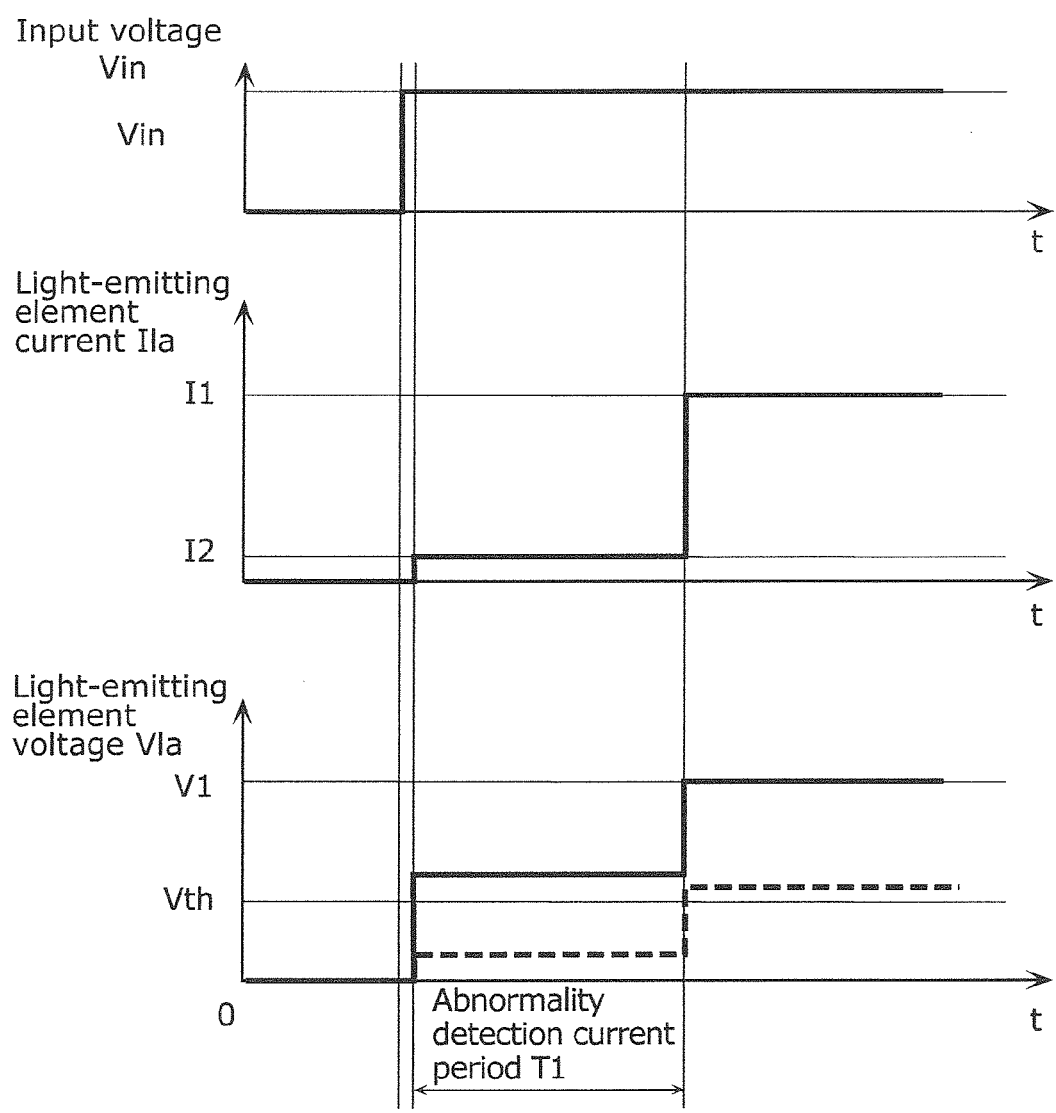
FIG. 5 is a timing chart for rated current and abnormality detection current according to Embodiment 1.

FIG. 4 is an operation flowchart for describing a light-emitting element lighting method according to Embodiment 1. Furthermore, FIG. 5 is a timing chart for rated current and abnormality detection current according to Embodiment 1.

First, when the power supply of the light-emitting element lighting device is provided, the light-emitting element lighting device 1 executes an initialization process (S11). As illustrated in FIG. 5, for example, when an input voltage Vin is applied to the light-emitting element lighting device 1 from the power supply 2, a power supply voltage Vcc is supplied to the control circuit 50 and the current command circuit 60.

Next, the control circuit 50, upon receiving an instruction from the current command circuit 60, passes an abnormality detection current I2 to the light-emitting element 3 (S12). Stated differently, immediately after the power supply is provided, the current command circuit 60 selects the detection mode during a setting period T1. Here, the abnormality detection current I2 is a lighting current which is lower than the rated current. Furthermore, the abnormality detection current I2 is passed to the light-emitting element 3 during the period T1. Step S12 is a mode selecting step for selecting the detection mode for passing the abnormality detection current I2, which is smaller than a rated current I1, for detecting an abnormality in the organic EL light-emitting element.

While the abnormality detection current I2 is being passed to the light-emitting element 3, the voltage detection circuit 40 executes the measurement of a voltage across both ends Vla of the light-emitting element 3 (S13). The voltage across both ends is obtained by measuring the voltage at the point of voltage division between the resistive element 401 and the resistive element 402. Step S13 is a voltage detecting step for detecting the voltage across both ends of the organic EL light-emitting element.

Here, a comparison is performed as to whether or not the voltage across both ends Vla is higher than an abnormality detection threshold voltage Vth (S14). The abnormality detection threshold voltage Vth is a threshold voltage which is set to a value smaller than the smallest value of a lighting start voltage V0, for judging an abnormality in the light-emitting element 3. If the voltage across both ends Vla is higher than the abnormality detection threshold voltage Vth (Yes in S14; solid line in FIG. 5), the operation proceeds to step S15. If the voltage across both ends Vla is lower than or equal to the abnormality detection threshold voltage Vth (No in S14; broken line in FIG. 5), the light-emitting element 3 is turned OFF (S19). Step S14 and step S19 are current controlling steps for stopping current output to the organic EL light-emitting element in the case where the voltage across both ends is lower than or equal to the abnormality detection threshold voltage Vth in the detection mode.

Next, in step S15, the voltage detection circuit 40 continues measuring the voltage across both ends Vla while the time for passing the abnormality detection current I2 is less than or equal to the setting period T1. On the other hand, when the time for passing the abnormality detection current I2 becomes longer than the setting period T1 (Yes in S15), the control circuit 50 and the step-down chopper circuit 20 pass a rated current I1 to the light-emitting element 3 upon receiving an instruction from the current command circuit 60 (S16). Step S16 is a mode selecting step for selecting the rated mode for passing the rated current for turning ON the organic EL light-emitting element.

Here, a comparison is performed as to whether or not the voltage across both ends Vla is higher than the abnormality detection threshold voltage Vth (S17). If the voltage across both ends Vla is higher than the abnormality detection threshold voltage Vth (Yes in S17), a turn OFF state of the light-emitting element 3 is judged (i.e., whether or not a turn OFF signal is received), and the operation returns to the light-emitting element steady turning ON process in S16 when a turn OFF signal is not received. When a turn OFF signal is received (Yes in S18), the light-emitting element 3 is turned OFF (S19). Furthermore, if in step S17 the voltage across both ends Vla is lower than or equal to the abnormality detection threshold voltage Vth (No in S17), the light-emitting element 3 is turned OFF (S19).

As described above, in the lighting timing according to this embodiment, when the input voltage Vin is applied, the abnormality detection current I2 is passed during the setting period T1, and subsequently, the rated current I1 is passed. In the setting period T1, when the voltage across both ends of the light-emitting element is abnormal, current output to the light-emitting element is stopped.

It should be noted that, it is preferable that the setting period T1 be set to less than or equal to 100 ms so that a user does not feel a turn ON delay.

According to the light-emitting element lighting device 1 and the light-emitting element lighting method according to this embodiment, short-circuit abnormality is judged according to whether or not the voltage of the light-emitting element, which is detected when the abnormality detection current I2 that is lower than the rated current I1 is passed, is lower than or equal to the abnormality detection threshold voltage Vth which is lower than the rated voltage V1. Therefore, compared to the case where short-circuit abnormality is judged according to the voltage detected when the rated current I1 is passed, it is possible to clearly distinguish between the voltage of a normal light-emitting element and the voltage of a short-circuited abnormal light-emitting element, and thus a short-circuit abnormality can be detected with high accuracy. Furthermore, current output to a short-circuited abnormal element can be reliably stopped. In addition, since short-circuit abnormality is detected at the time of activation, non light-emitting time can be suppressed.

(Detection Principle)

Here, the advantageous effects produced by the above-described light-emitting element lighting device and light-emitting element lighting method according to this embodiment compared to the conventional apparatus and method shall be described.

Figure 6:
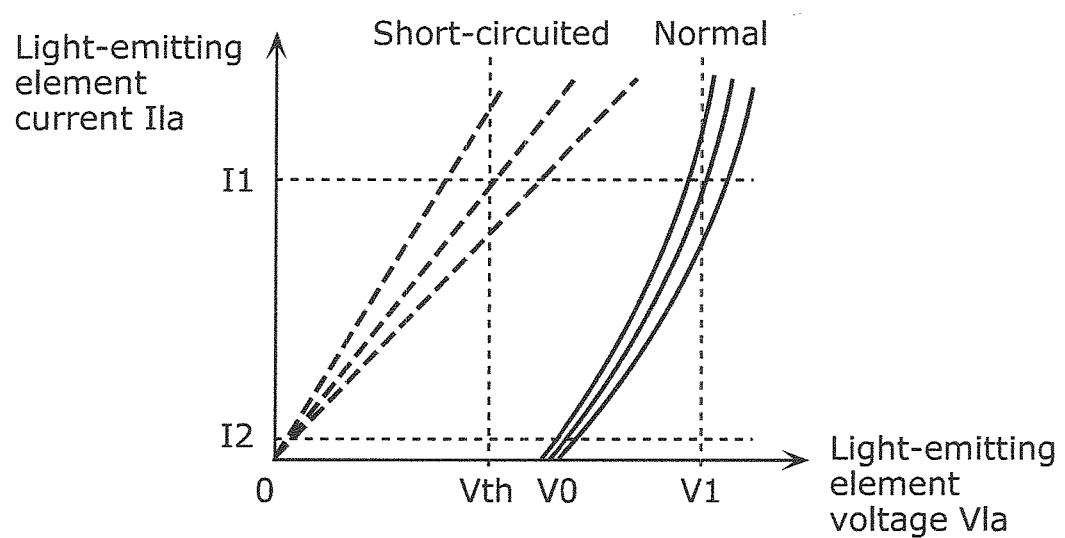
FIG. 6 is a graph illustrating voltage-current characteristics of a normal and short-circuited abnormal light-emitting element.

FIG. 6 is a graph illustrating voltage-current characteristics of a normal and short-circuited abnormal light-emitting element. In the figure, the solid lines (3 lines) denote the voltage-current characteristics of a normal light-emitting element. The voltage at which light emission by the light-emitting element starts is a lighting start voltage V0. Furthermore, the rated voltage when the rated current I1 is passed is V1. Here, the rated current is a constant current in the case where the light-emitting element 3 is turned ON continuously (emits light continuously at a rated luminance) as a light source of an illuminating apparatus.

On the other hand, the broken lines (3 lines) denote the voltage-current characteristics of a short-circuited abnormal light-emitting element. When the current is 0 A, the voltage is 0 V, and approximately linear voltage-current characteristics (resistance characteristics) are shown.

As illustrated in FIG. 6, the voltage-current characteristics of a short-circuited abnormal light-emitting element have significant variation in resistance value (slope of current with respect to voltage) due to such short-circuited state. Here, in the case where the rated current I1 is passed to the light-emitting element and an abnormal light-emitting element is judged according to the voltage value of the light-emitting element at such time, variation causes the voltage value of a short-circuited abnormal light-emitting element to approach the rated voltage V1 which is the voltage across both ends of a normal light-emitting element, and thus there is a possibility of misjudging the abnormal light-emitting element as being normal.

In contrast, as the test current passed to the light-emitting element is made smaller than the rated current I1, the voltage value of the normal light-emitting element approaches the lighting start voltage V0 and the voltage value of the abnormal light-emitting element approaches 0 while variation is reduced. In other words, as the abnormality detection current I2 is set lower than the rated current I1, the difference between the voltage of the normal light-emitting element and the voltage of the abnormal light-emitting element becomes bigger, and thus the setting margin for the abnormality detection threshold voltage Vth can be ensured, and more accurate judgment is possible.

From the above perspective, it is preferable that the abnormality detection threshold voltage Vth be set lower than the lighting start voltage V0. Furthermore, although it is sufficient that the abnormality detection current I2 is set to be smaller than the rated current I1, in order to enhance detection accuracy, it is preferable that the abnormality detection current I2 be set to less than or equal to 10% to 1% of the rated current I1.

The respective setting parameters in this embodiment shall be illustrated by example below. For example, the rated voltage V1 of an organic EL light-emitting element is 7.5 V, and the rated current I1 is 0.3 A. At this time, the light-emitting area is 64 cm$^2$, the lighting start voltage V0 is 4 V, the abnormality detection threshold voltage Vth is 3 V, and the abnormality detection current I2 is 10 mA. Here, assuming that the light-emitting element voltage when the rated current I1 is passed is 5 V, in a short-circuited abnormal light-emitting element, the light-emitting voltage becomes higher than or equal to the abnormality detection threshold voltage Vth (as a resistance value: 16.7Ω (=5V/0.3 A)), and thus a short-circuit abnormality cannot be detected using the rated current I1. In contrast, the light-emitting element voltage when the abnormality detection current I2 is passed is 0.17 V (=16.7 Ω×10 mA) which is lower than the abnormality detection threshold voltage Vth, and thus a short-circuit abnormality can be detected.

Modification

Figure 7:
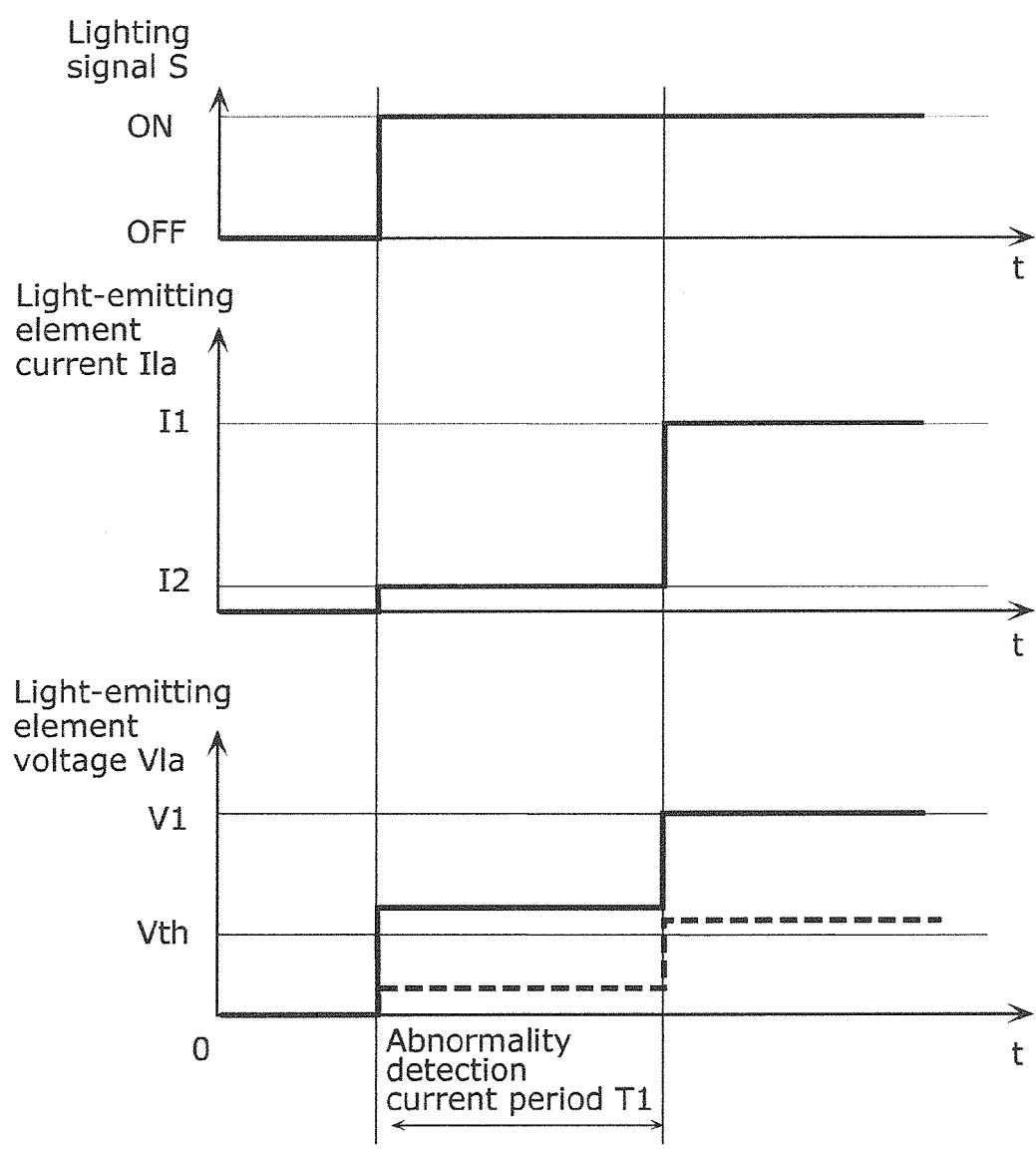
FIG. 7 is a timing chart for rated current and abnormality detection current according to Embodiment 1.

FIG. 7 is a timing chart for rated current and abnormality detection current according to a modification of Embodiment 1. Compared to the lighting method according to Embodiment 1, a lighting method according to this modification is different only in the timing at which the abnormality detection current I2 is passed. Specifically, in this embodiment, when the lighting signal S is inputted to the lighting signal receiving circuit 70, the current command circuit 60 passes the abnormality detection current I2 during the setting period T1, and subsequently passes the rated current I1. In other words, immediately after the lighting signal S received by the lighting signal receiving circuit 70 is inputted, the current command circuit 60 selects the detection mode during the setting period T1.

The light-emitting element lighting method according to this modification produces the same advantageous effects as the light-emitting element lighting method according to Embodiment 1. In other words, since short-circuit abnormality is detected at the time of activation, non light-emitting time can be suppressed.

Embodiment 2

Figure 8:
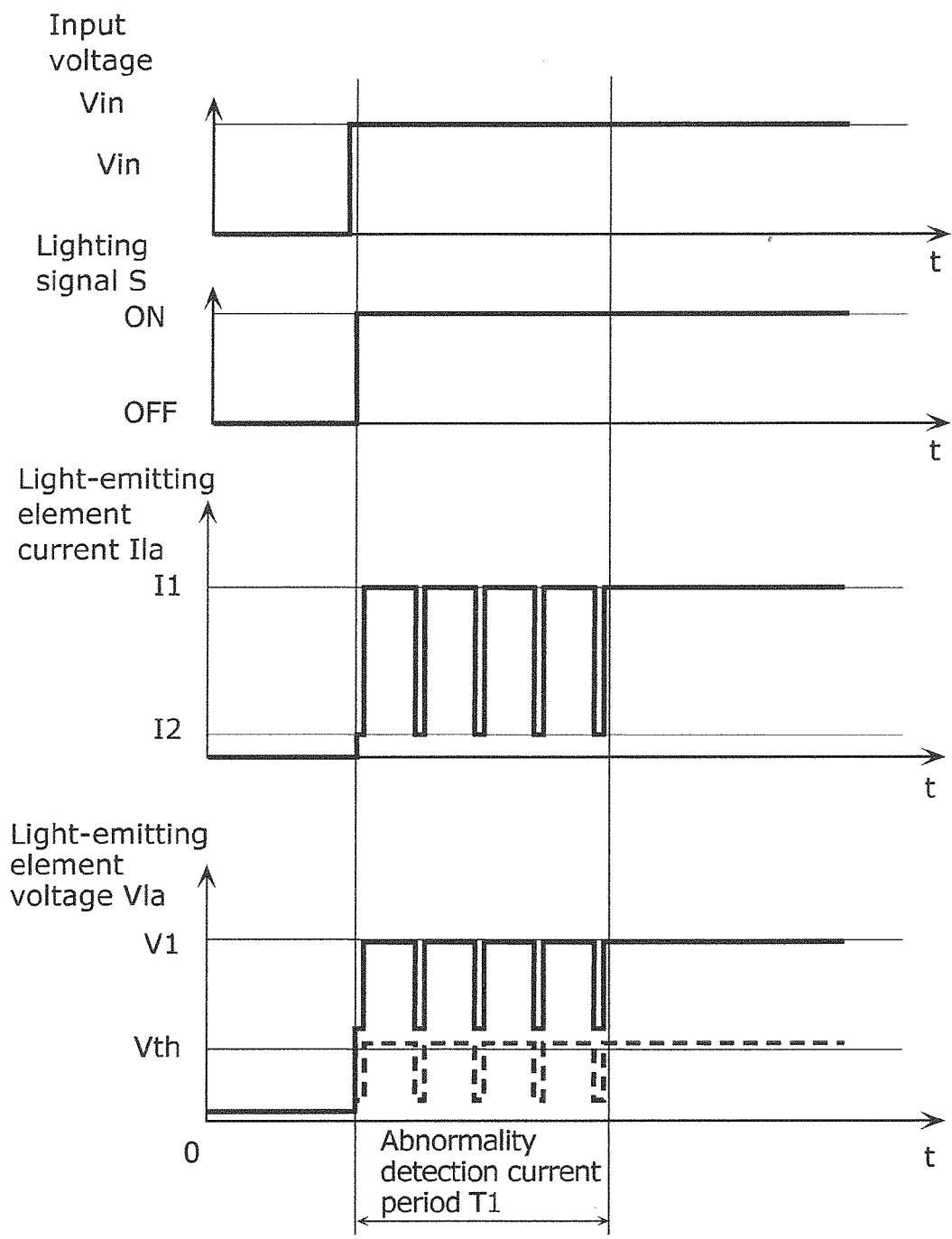
FIG. 8 is a timing chart for rated current and abnormality detection current according to Embodiment 2.

A light-emitting element lighting device and a lighting method thereof according to Embodiment 2 shall be described using FIG. 8. The light-emitting element lighting device according to this embodiment has the same configuration as the light-emitting element lighting device according to Embodiment 1, and is different only in the output timing of the rated current I1 and the abnormality detection current I2 instructed by the current command circuit 60. Points which are substantially the same as in Embodiment 1 shall be omitted, and description shall be carried out hereafter focusing on the points of difference.

FIG. 8 is a timing chart for rated current and abnormality detection current according to Embodiment 2. The point of difference with the output timing of the rated current and the abnormality detection current according to Embodiment 1 is that abnormality detection is performed not by passing the abnormality detection current I2 in only one period after power supply is provided and after the lighting signal S is received, but by passing the rated current I1 and the abnormality detection current I2 repeatedly one after the other.

As illustrated in FIG. 8, according to the output timing for the rated current I1 and the abnormality detection current I2 according to this embodiment, the rated current I1 and the abnormality detection current I2 are repeatedly passed. Here, it is preferable that the ratio between the rated current I1 and the abnormality detection current I2 be set to less than or equal to 9:1, 99:1, and so on, in order to suppress reduction in the amount of light emission.

In other words, according to the light-emitting element lighting device according to this embodiment, the current command circuit 60 alternately selects the rated mode and the detection mode immediately after power supply is provided or immediately after a lighting signal is inputted, and determines the periods of the rated mode and the detection mode such that the organic EL light-emitting device emits light at a predetermined luminance.

It should be noted that although the output timing illustrated in FIG. 8 shows abnormality detection being performed when the input voltage Vin is applied or in the initial stage of lighting immediately after the lighting signal S is received, the output timing according to this embodiment is not limited to such. In other words, it is possible to change the current value (repeat the rated current I1 and the abnormality detection current I2) and perform abnormality detection while suppressing reduction in the amount of light emission, not only at the initial stage of lighting but also in midstream of lighting.

Accordingly, by performing abnormality detection at an arbitrary time, it is possible to more accurately detect a short-circuited abnormal state even for a light-emitting element that has deteriorated with age and become abnormal in midstream of being turned ON.

Embodiment 3

Figure 9:
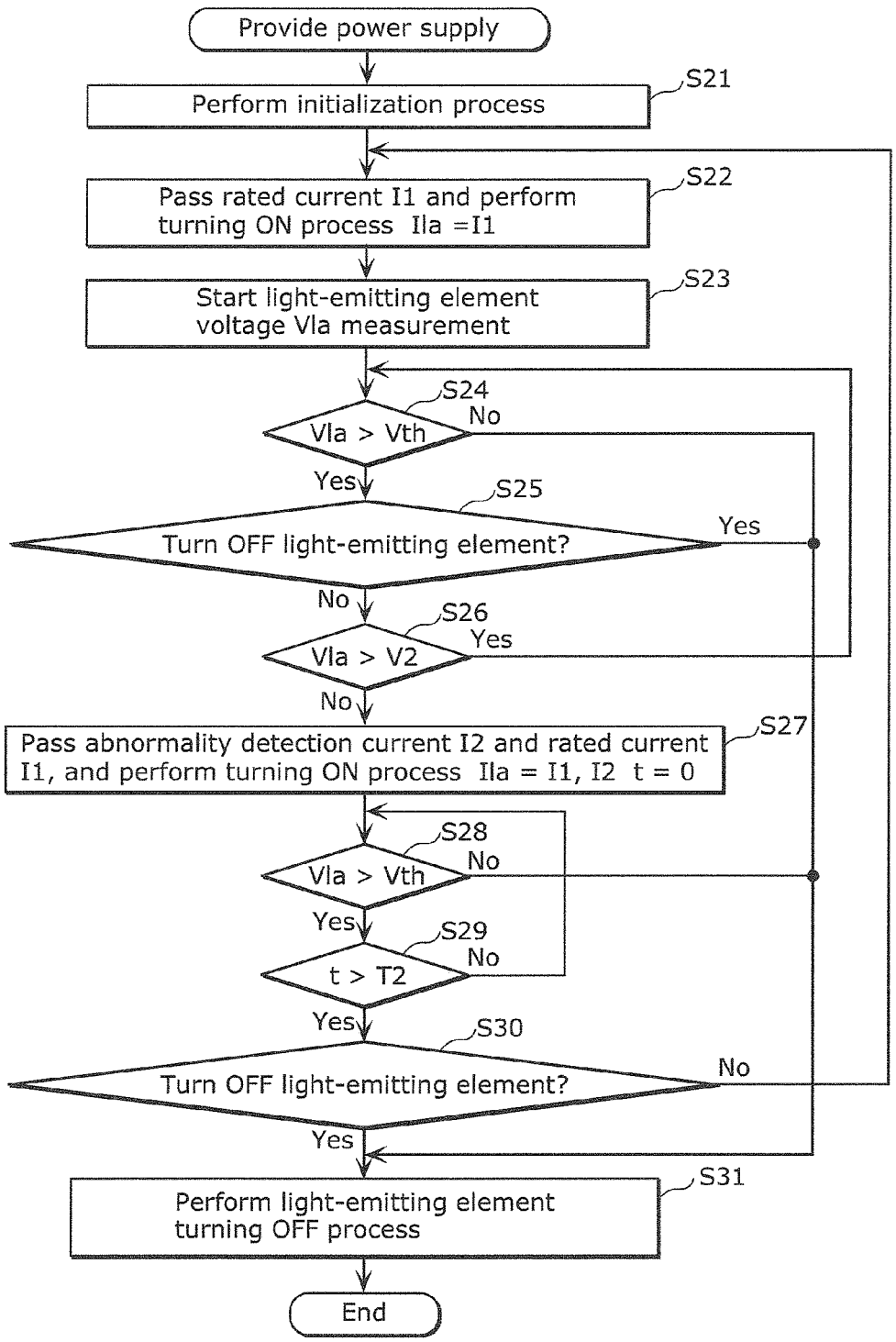
FIG. 9 is an operation flowchart for describing a light-emitting element lighting method according to Embodiment 3.
Figure 10:
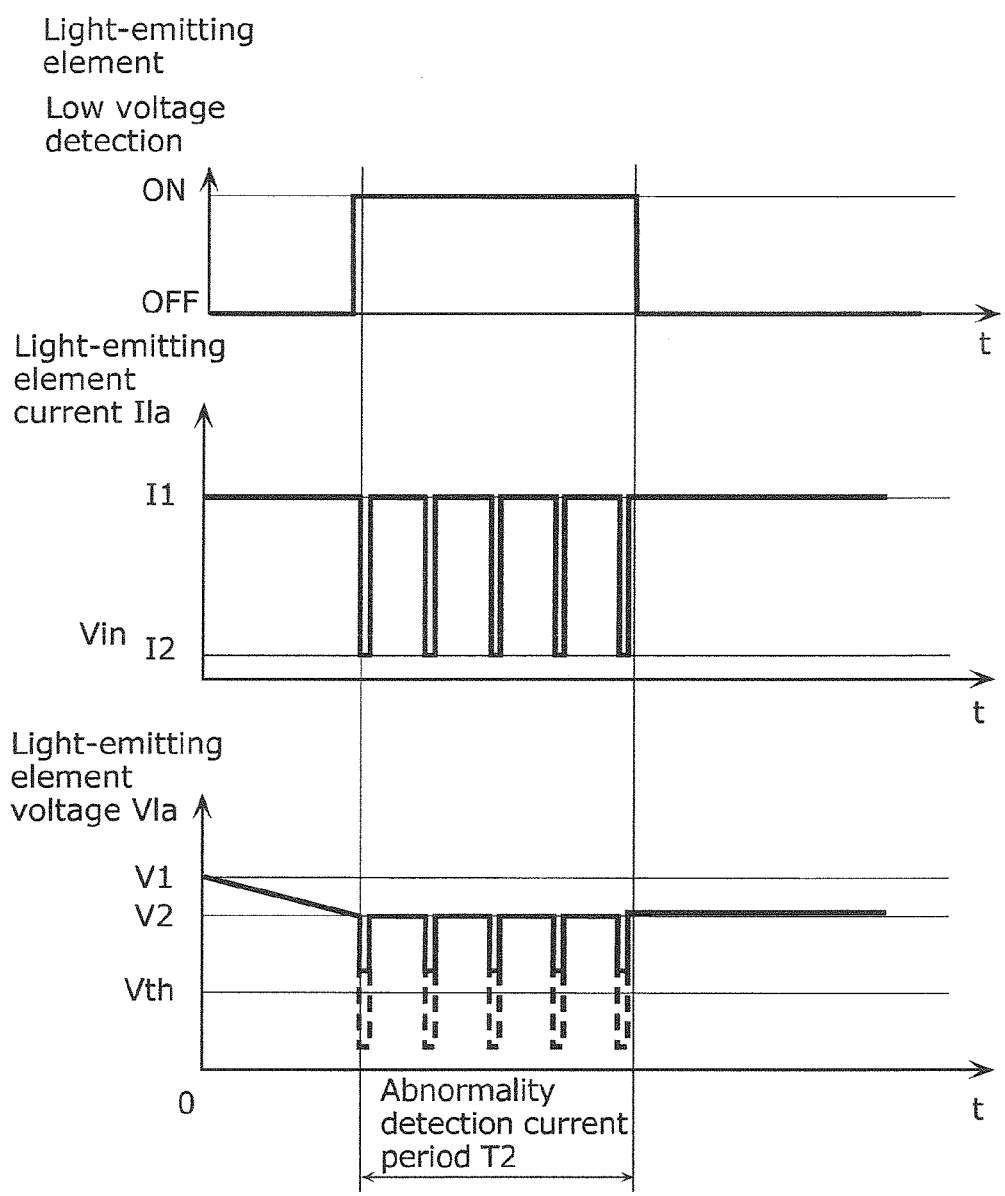
FIG. 10 is a timing chart for rated current and abnormality detection current according to Embodiment 3.

A light-emitting element lighting device and a lighting method thereof according to Embodiment 3 shall be described using FIGS. 9 and 10. The light-emitting element lighting device according to this embodiment has the same configuration as the light-emitting element lighting device according to Embodiment 1, and is different only in the mode selection criteria of the current command circuit 60, and the output timing of the rated current I1 and the abnormality detection current I2. Hereinafter, points which are substantially the same as in Embodiment 1 shall be omitted, and description shall be carried out focusing on the points of difference.

FIG. 9 is an operation flowchart for describing a light-emitting element lighting method according to Embodiment 3. Furthermore, FIG. 10 is a timing chart for rated current and abnormality detection current according to Embodiment 3.

First, when the power supply of the light-emitting element lighting device is provided, the light-emitting element lighting device executes an initialization process (S21).

Next, the light-emitting element lighting device performs a steady turning ON process (S22). Specifically, the control circuit 50, upon receiving an instruction from the current command circuit 60, passes the rated current I1 to the light-emitting element 3.

Next, while the rated current I1 is being passed to the light-emitting element 3, the voltage detection circuit 40 executes the measurement of the voltage across both ends V1a of the light-emitting element 3 (S23).

Here, a comparison is performed as to whether or not the voltage across both ends V1a is higher than the abnormality detection threshold voltage Vth (S24). If the voltage across both ends V1a is higher than the abnormality detection threshold voltage Vth (Yes in S24), the operation proceeds to step S25. If the voltage across both ends V1a is lower than or equal to the abnormality detection threshold voltage Vth (No in S24), the light-emitting element 3 is turned OFF (S31).

Next, in step S25, a turn OFF state of the light-emitting element 3 is judged (i.e., whether or not a turn OFF signal is received, and the operation proceeds to step S26 when a turn OFF signal is not received. When a turn OFF signal is received (Yes in S25), the light-emitting element 3 is turned OFF (S31).

Next, in step S26, a comparison is performed as to whether the voltage across both ends V1a is higher than a predetermined voltage V2 which is lower than the rated voltage V1 (S26). When the voltage across both ends V1a is lower than or equal to the predetermined voltage V2 (No in S26), the abnormality detection current I2 is passed to the light-emitting element 3 (S27). Furthermore, the abnormality detection current I2 is passed to the light-emitting element 3 during the period T2. When the voltage across both ends V1a is higher than the voltage V2 (Yes in S26), the operation returns to step S24.

In step S27, a comparison is performed as to whether or not the voltage across both ends V1a is higher than the abnormality detection threshold voltage Vth (S28). The abnormality detection threshold voltage Vth is a threshold voltage which is set to a value smaller than the smallest value of a lighting start voltage V0, for judging an abnormality in the light-emitting element 3. If the voltage across both ends V1a is higher than the abnormality detection threshold voltage Vth (Yes in S28), the operation proceeds to step S29. If the voltage across both ends V1a is lower than or equal to the abnormality detection threshold voltage Vth (No in S28; broken line in FIG. 10), the light-emitting element 3 is turned OFF (S31).

Next, in step S29, the voltage detection circuit 40 continues measuring the voltage across both ends V1a while the time for passing the abnormality detection current I2 is less than or equal to the setting period T2. On the other hand, when the time for passing the abnormality detection current I2 exceeds the setting period T2 (Yes in S29), the operation proceeds to step S30.

Next, in step S30, the turn OFF state of the light-emitting element 3 is judged (i.e., whether or not a turn OFF signal is received), and the operation returns to step S22 when a turn OFF signal is not received. When a turn OFF signal is received (Yes in S30), the light-emitting element 3 is turned OFF (S31).

The flow of the aforementioned lighting method shall be discussed briefly using FIG. 10. When the voltage of the light-emitting element 3 becomes lower than a voltage V2, the abnormality detection current I2 and the rated current I1 are passed repeatedly during the period T2, and, subsequently, the rated current I1 is passed. In FIG. 10, the waveform illustrated by a solid line represents normal time and the waveform illustrated by a broken line represents the abnormal time. In the case of the abnormal time, detection is performed in period T2, and current output is stopped. Specifically, the current command circuit 60 selects the detection mode when the voltage across both ends of the light-emitting element in the rated mode becomes lower than or equal to the predetermined voltage V2 which is lower than the rated voltage V1. In addition, when the voltage across both ends in the rated mode becomes lower than or equal to the voltage V2, the current command circuit 60 may cause current output by alternately selecting the rated mode and the detection mode.

It should be noted that the period T2 is, for example, approximately several hundred milliseconds. When the voltage across both ends of the light-emitting element 3 is below the voltage V2, the abnormality detection current period is continued. Furthermore, it is acceptable to provide a period in which re-detection is not allowed for a predetermined period once it is detected that the voltage across both ends has dropped below voltage V2.

According to the light-emitting element lighting method according to this embodiment, it is possible to reduce a non light-emitting period and more accurately detect a short-circuited abnormal state of a light-emitting element while the light-emitting element is turned ON, and stop the flow of current to the light emitting-element.

Embodiment 4

A light-emitting element lighting device and a lighting method thereof according to Embodiment 4 shall be described using FIG. 11 to FIG. 14. The light-emitting element lighting device according to this embodiment has the same configuration as the light-emitting element lighting device according to Embodiment 1, and is different in the timing at which light-emitting element voltage detection is performed. Hereinafter, points which are substantially the same as in Embodiment 1 shall be omitted, and description shall be carried out focusing on the points of difference.

Figure 11:
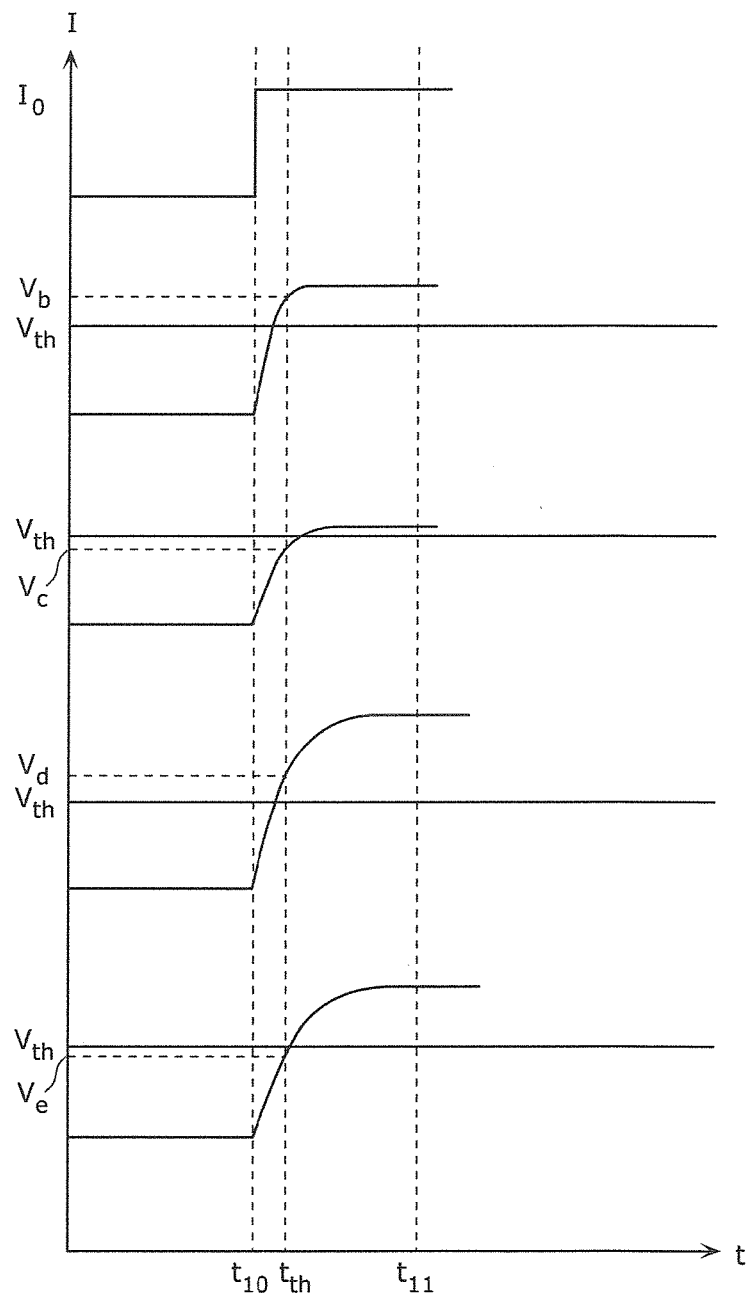
FIG. 11 is a timing chart for light-emission current and light-emission voltage according to Embodiment 4.

FIG. 11 is a timing chart for light-emission current and light-emission voltage according to Embodiment 4. The timing for detecting the voltage across both ends of the light-emitting element according to this embodiment is different from the timing for detecting the voltage across both ends of the light-emitting element according to Embodiment 1 in that, where the time at which passing of the rated current is started is $t_{10}$ and the time at which the light-emission voltage becomes steady is $t_{11}$, light-emission voltage is detected at a predetermined detection time $t_{th}$ within the abnormality detection current period ($t_{10}$ to $t_{11}$).

In the case where n pieces of light-emitting elements 3, the number of which is already known, are connectively arranged in series, it can be considered that the capacitance components of the light-emitting elements 3 are connectively arranged in series. Here, the n pieces of light-emitting elements 3 that are connected in series are defined as a light-emitting module. In this case, during the rise of the rated current, there is a delay in the rise of the voltage across both ends of the light-emitting module caused by the capacitance component of the light-emitting module, as illustrated in (a) in FIG. 11.

For example, when one out of the n pieces of serially connected light-emitting elements 3 is short-circuited, the capacitance component of the short-circuited light-emitting element 3 changes into a resistance component. As such, it can be considered that one of the serially connected capacitance components has changed into a resistance component, and time constant increases. With this, the voltage across both ends of the light-emitting module is as represented by the waveform illustrated in (c) in FIG. 11. Specifically, due to the increase of the time constant, in the detection time $t_{th}$, which is the rise time of the voltage across both ends, the voltage across both ends Vc is lower than a voltage Vb at the detection time $t_{th}$ of the light-emitting module in which all the n pieces are normal.

Furthermore, the characteristics of the light-emitting module vary together with operating life. As such, with regard to the detection of change in the voltage across both ends due to the short-circuiting of a light-emitting element 3, the operating life of the light-emitting module needs to be taken into consideration.

For example, in the case where the n pieces of serially connected light-emitting elements 3 are at the end of life, the voltage across both ends has the waveform illustrated in (d) in FIG. 11, and although the steady value of the voltage across both ends of the light-emitting module increases compared to the steady value of the voltage across both ends of the light-emitting module which is not at the end of life illustrated in (b) in FIG. 11, the time constant also increases. As such, the voltage Vd at the detection time $t_{th}$ of the light-emitting module which is at the end of life and in which all the n pieces are normal does not vary greatly compared to the voltage Vb.

In contrast, when one out of the n pieces of the serially connected light-emitting elements 3 is short-circuited in the light-emitting module which is at the end of life, the voltage across both ends of the light-emitting module has the waveform illustrated in (e) in FIG. 11. Specifically, due to the increase of the time constant, in the detection time $t_{th}$, the voltage across both ends Ve of the light-emitting module is lower than a voltage Vd at the detection time $t_{th}$ of the light-emitting module in which all the n pieces are normal. Following the above-described characteristics of the light-emitting module, the voltage across both ends is detected in the detection time $t_{th}$ within the abnormality detection current period ($t_{10}$ to $t_{11}$) and compared to find out if it is higher than the abnormality detection threshold voltage $V_{th}$. With this, abnormality of a light-emitting module including plural light-emitting elements 3 which are connected in series can be accurately judged.

Figure 12:
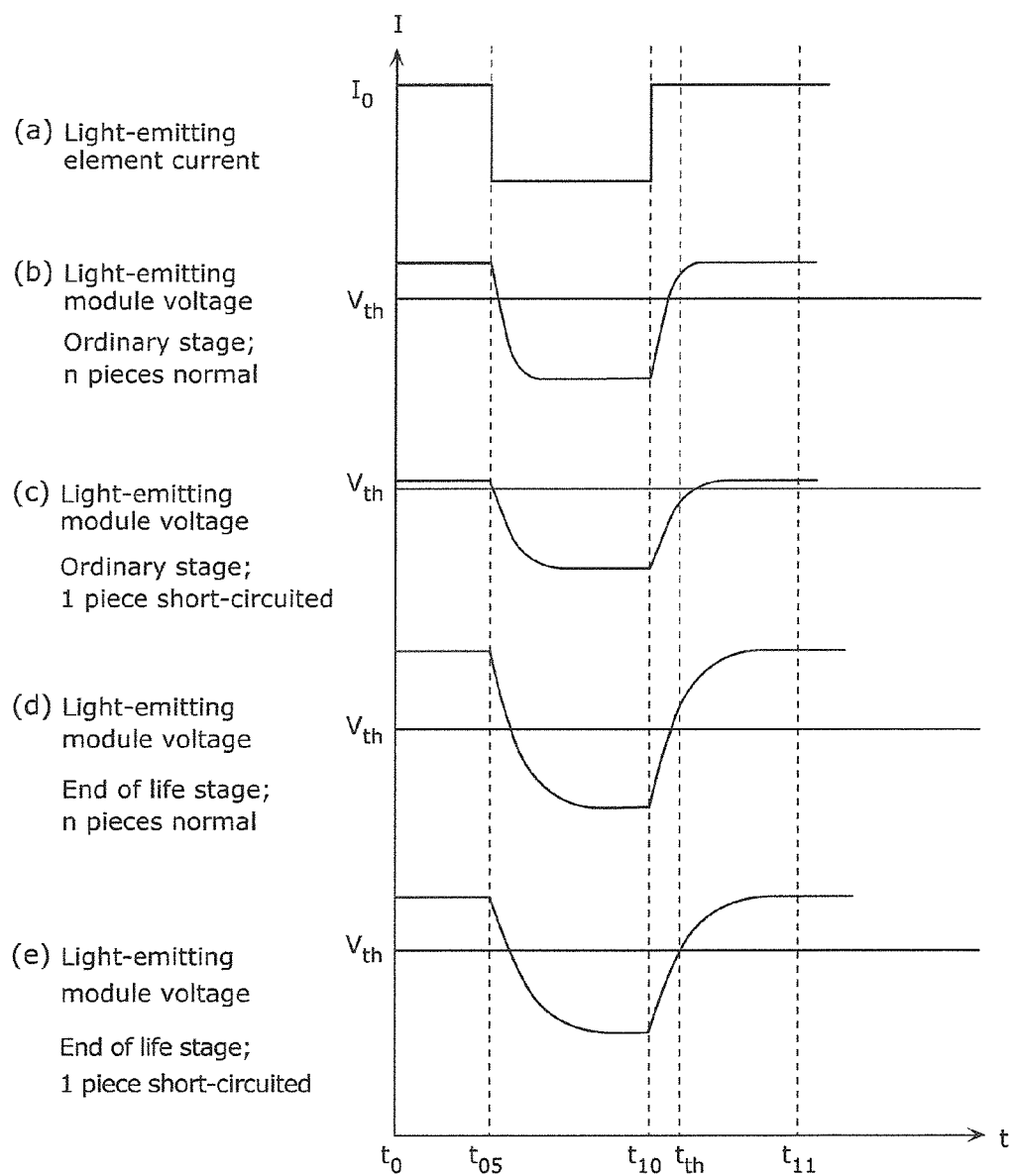

FIG. 12 is a timing chart for light-emission current and light-emission voltage when an abnormality detection method according to Embodiment 4 is used while a light-emitting element is turned ON. Before and after a time $t_0$, a rated current $I_0$ flows in the light-emitting module. Here, in order to detect an abnormality of the light-emitting module within the abnormality detection voltage period ($t_{10}$ to $t_{11}$), the rated current $I_0$ is stopped in the period from time $t_{05}$ to time $t_{10}$. Then, at the time $t_{10}$, the rated current $I_0$ rises. With this, abnormality in the light-emitting module in which the number of pieces of light-emitting elements is already known can be judged accurately.

In other words, according to the light-emitting element lighting device according to this embodiment, the current command circuit 60 causes the stopping of the output of current to the light-emitting module which is either a single light-emitting element 3 or plural light-emitting elements 3 connected in series, in the case where, in the detection mode which is set in a transient period ($t_{10}$ to $t_{11}$) in which current transitions from a current smaller than a rated current to the rated current, the voltage across both ends of the light-emitting module detected at the detection time $t_{th}$ within the transient period is lower than or equal to the abnormality detection threshold voltage $V_{th}$ which is set lower than a sum rated voltage which is the sum of the rated voltages at the time when the light-emitting elements 3 included in the light-emitting module are turned ON.

It should be noted that the detection time $t_{th}$ for detecting the voltage across both ends of the light-emitting module may be set at an ON time (at a time when the input voltage Vin is in the ON state).

Figure 13:
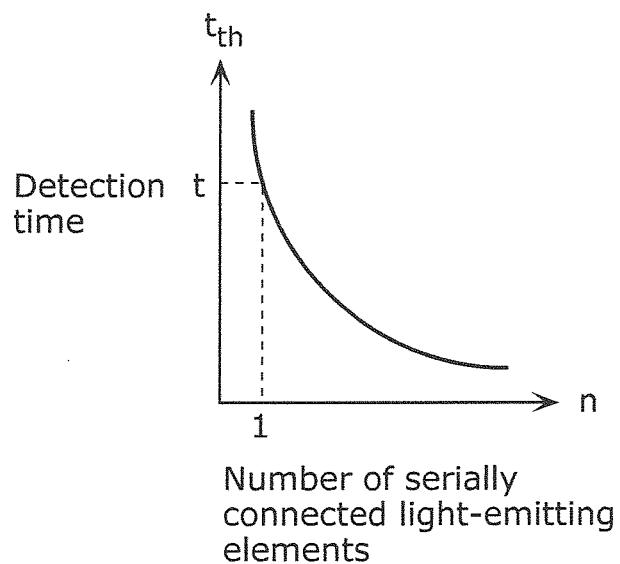
FIG. 13 is a graph illustrating a relationship between the number of serially connected light-emitting elements in a light-emitting module and detection time.
Figure 14:
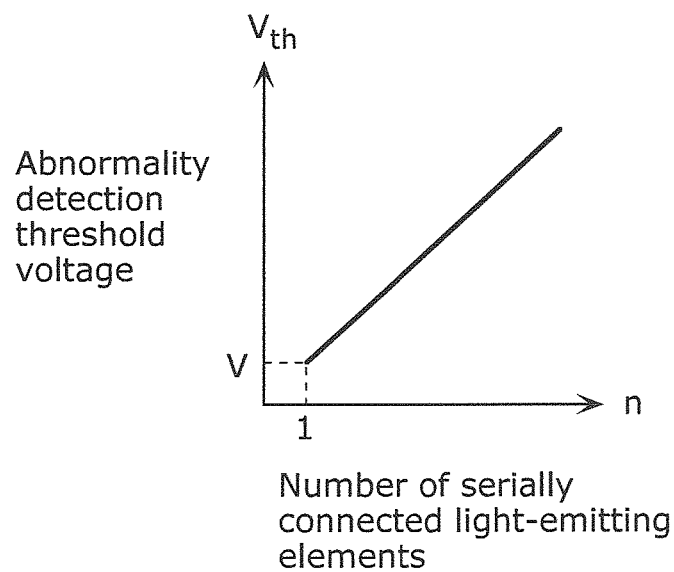
FIG. 14 is a graph illustrating a relationship between the number of serially connected light-emitting elements in a light-emitting module and abnormality detection threshold voltage.

FIG. 13 is a graph illustrating a relationship between the number of serially connected light-emitting elements in a light-emitting module and detection time, and FIG. 14 is a graph illustrating a relationship between the number of serially connected light-emitting elements in a light-emitting module and abnormality detection threshold voltage. As illustrated in FIG. 13, since the light-emission voltage becomes higher as the number of serially connected light-emitting elements in the light-emitting module is higher, the detection time $t_{th}$ (i.e., the period from time $t_{10}$ to $t_{th}$) for accurately measuring the voltage across both ends of the light-emitting module can be set to be short. Furthermore, as illustrated in FIG. 14, since the light-emission voltage becomes higher as the number of serially connected light-emitting elements in the light-emitting module is higher, the abnormality detection threshold voltage $V_{th}$ is set high to ensure accuracy in detecting the abnormality of a single light-emitting element 3.

According to the light-emitting module abnormality detection method according to this embodiment, in detecting an abnormality in a light-emitting module having a large capacitance component, the voltage across both ends of the light-emitting module is measured in the transient state in which current transitions from a current smaller than a rated current to the rated current. Therefore, abnormality of a light-emitting module including light-emitting elements which are connected in series can be accurately detected. Furthermore, compared to the case of passing an abnormality detection current which is smaller than the rated current and measuring the voltage across both ends of the light-emitting module in a state in which the voltage across both ends is in a steady state, the abnormality of the light-emitting module can be detected rapidly.

Embodiment 5

Hereinafter, a light-emitting module according to Embodiment 5 shall be described using FIG. 15.

Figure 15:
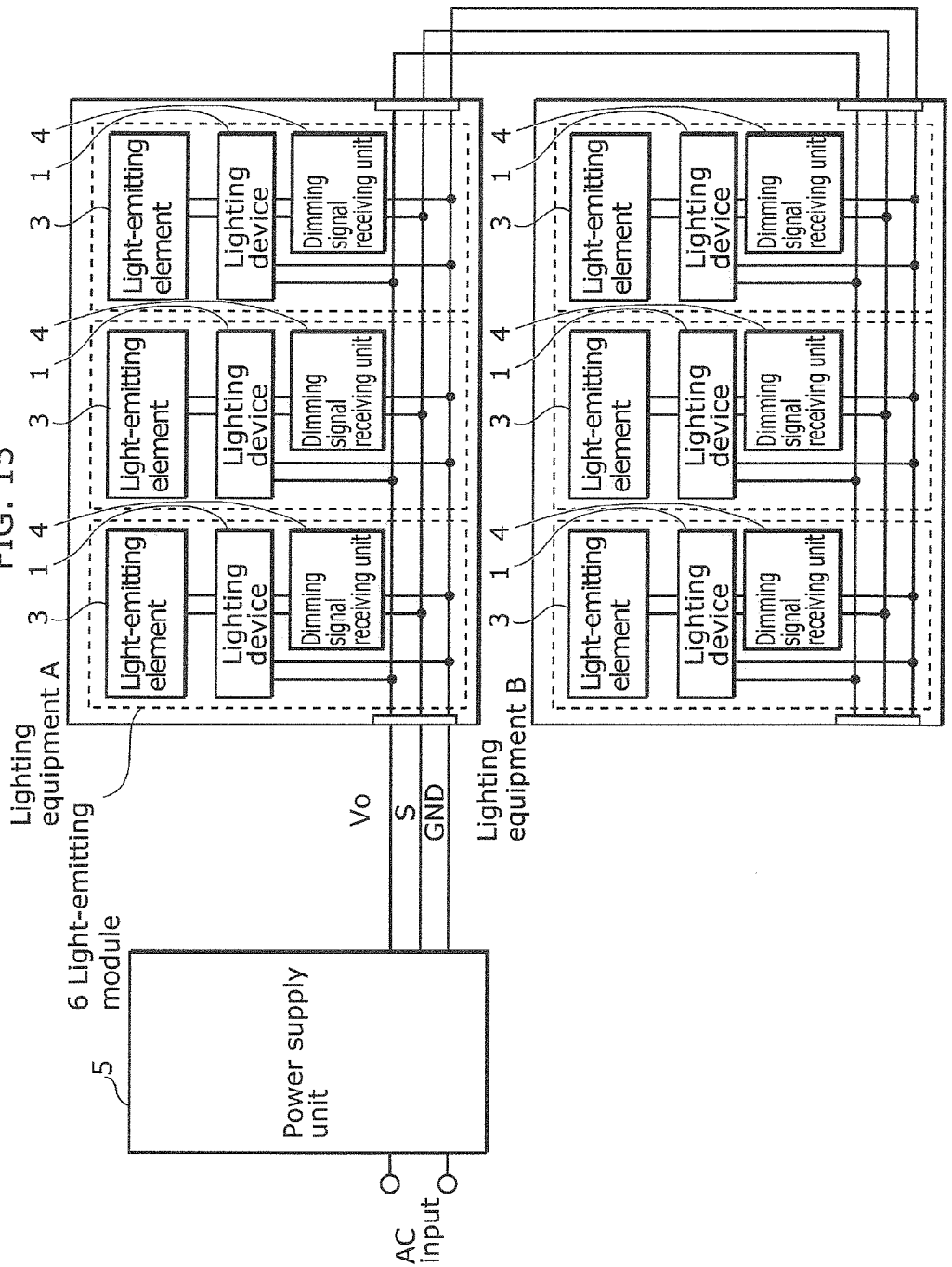
FIG. 15 is a block configuration diagram of an illuminating system including a light-emitting module according to Embodiment 5.

FIG. 15 is a block configuration diagram of an illuminating system including a light-emitting module according to Embodiment 5. The illuminating system illustrated in the figure includes a power supply unit 5, lighting equipment A, and lighting equipment B. The lighting equipment A and the lighting equipment B each include plural light-emitting modules 6. Furthermore, each light-emitting module 6 includes the light-emitting element 3, the light-emitting element lighting device 1, and a dimming signal receiving unit 4.

The light-emitting element 3 is an organic EL light-emitting element in which input current and light output are in an approximately proportionate relationship, and is composed of a single or plural light-emitting elements.

The light-emitting element lighting device 1 is a light-emitting element lighting device according to any one of Embodiments 1 to 3, runs on a constant current control system, and includes, for example, a step-down chopper circuit. In addition, the light-emitting element lighting device 1 has a dimming function, and performs amplitude dimming, PWM dimming, or the like, upon receiving a signal from the dimming signal receiving unit 4.

The dimming signal receiving unit 4 converts a dimming signal from the power supply unit 5 into a command value and transmits the command value to the light-emitting element lighting device 1.

With the light-emitting module 6 according to this embodiment, it is possible to accurately detect the short-circuited abnormal state of the light-emitting element 3, and stop the current to the light-emitting element 3 that has been judged to be short-circuited.

It should be noted that the same advantageous effect can be obtained whether the number of light-emitting modules 6 included in the lighting equipment is more than or less than three.

Embodiment 6

Hereinafter, an illuminating apparatus according to Embodiment 6 shall be described using FIG. 16.

Figure 16:
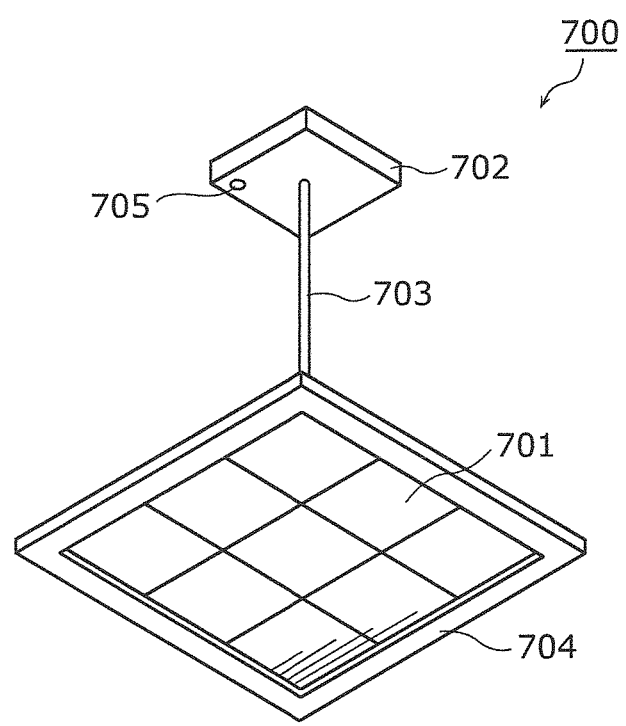
FIG. 16 is an outline perspective view of an illuminating apparatus according to Embodiment 6.
Figure 17:
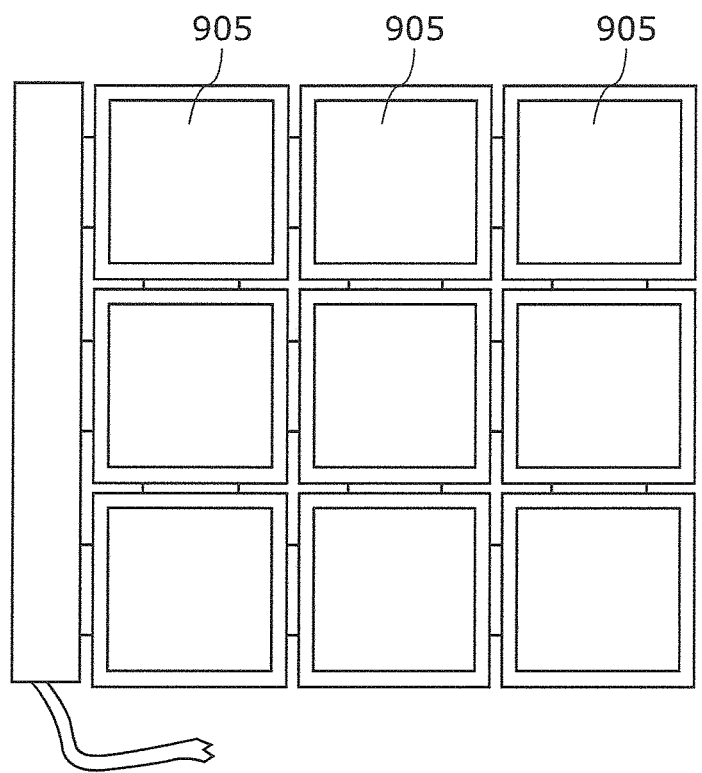
FIG. 17 is an outline configuration diagram of a conventional light-emitting unit apparatus disclosed in PTL 1.

FIG. 16 is a perspective view of an external appearance of the illuminating apparatus according to Embodiment 6. An illuminating apparatus 700 illustrated in the figure includes light-emitting element lighting devices and light-emitting modules according to Embodiments 1 to 4, and specifically includes a light-emitting unit 701 including plural light-emitting modules, suspending equipment 702 for installing the light-emitting unit to a ceiling, and a power supply cord 703 connecting the light-emitting unit 701 and the suspending equipment 702. The periphery of the light-emitting unit 701 is covered and protected by a lighting equipment case 704. The suspending equipment 702 includes on its surface a remote control receiving unit 705 for receiving a remote control signal transmitted from a remote control (not shown in the figure).

According to the illuminating apparatus 700 according to this embodiment, it is possible to accurately detect the short-circuited abnormal state of a light-emitting element 3, and stop the current to the light-emitting element 3 that has been judged to have a short-circuit abnormality.

It should be noted that although the illuminating apparatus 700 according to this embodiment is exemplified as being suspended from the ceiling, the same advantageous effect can be obtained even when it is installed on a wall.

Although light-emitting element lighting devices, light-emitting modules, illuminating apparatuses, and light-emitting element lighting methods according the present invention are described thus far based on Embodiments 1 to 6, the present invention is not limited to these embodiments. Forms obtained through various modifications to the above embodiments as well as forms obtained by arbitrary combinations of constituent elements in different embodiment that may be conceived by a person of ordinary skill in the art, for as long as they do not depart from the essence of the present invention, are included in the scope of one or plural aspects of the present invention.

It should be noted that, in Embodiments 1 to 3, the current command circuit 60 is described as selecting between the rated mode and the detection mode at various timings. However, according to the light-emitting element lighting device according to an aspect of the present invention, it is sufficient that the current command circuit 60 selects the detection mode at least once in a period in which the organic EL light-emitting element is continuously turned ON. With this, normal light-emitting element voltage and short-circuited abnormal light-emitting element voltage can be clearly distinguished, and thus short-circuit abnormality can be detected accurately. Furthermore, current output to a short-circuited abnormal element can be reliably stopped.

Furthermore, the circuit configuration illustrated in the foregoing circuit diagrams are examples, and the present invention is not limited by the foregoing circuit configurations. In other words, a circuit capable of realizing the characteristic functions of the present invention in the same manner as the foregoing circuit configurations is also included in the present invention. For example, a circuit in which an element such as a transistor, a resistive element, or a capacitive element is connected to a certain element in series or in parallel, within a scope that enables the same functions as the foregoing circuit configurations to be realized, is also included in the present invention. Stated differently, the connection between the elements in the foregoing embodiments include not only the case where terminals (nodes) of elements are directly connected, but also the case where the terminals (nodes) are connected via a different element, within a scope that enables the same functions to be realized.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A light-emitting element lighting device which turns ON an organic electroluminescence (organic EL) light-emitting element, the light-emitting element lighting device comprising:
 a current generation unit configured to output a current that flows to the organic EL light-emitting element;
 a mode selection unit configured to select one of (i) a rated mode for passing a rated current for turning ON the organic EL light-emitting element and (ii) a detection mode for passing an abnormality detection current, which is smaller than the rated current, for detecting an abnormality in the organic EL light-emitting element;
 a voltage detection unit configured to detect a voltage across both ends of the organic EL light-emitting element; and a current control unit configured to cause the current generation unit to stop outputting the current to the organic EL light-emitting element, when the voltage across both ends detected by the voltage detection unit in the detection mode is lower than or equal to an abnormality detection threshold voltage which is set lower than the rated voltage at a time when the organic EL light-emitting element is turned ON, wherein the mode selection unit is configured to select the rated mode and the detection mode alternately.

2. The light-emitting element lighting device according to claim 1, wherein the abnormality detection threshold voltage is set to be lower than or equal to a light emission start voltage at which the organic EL light-emitting element starts to emit light.

3. The light-emitting element lighting device according to claim 1, wherein the mode selection unit is configured to select the detection mode at least once in a period in which the organic EL light-emitting element is continuously turned ON.

4. The light-emitting element lighting device according to claim 1, wherein the mode selection unit is configured to select the detection mode for a predetermined period, immediately after power supply is provided.

5. The light-emitting element lighting device according to claim 1, further comprising a lighting signal receiving unit configured to receive a lighting signal from an outside source, wherein the mode selection unit is configured to select the detection mode for a predetermined period, immediately after the lighting signal received by the lighting signal receiving unit is inputted.

6. The light-emitting element lighting device according to claim 1, wherein the mode selection unit is configured to select the rated mode and the detection mode alternately immediately after power supply is provided, and determine periods for the rated mode and the detection mode with which the organic EL light-emitting element emits light at a predetermined luminance.

7. The light-emitting element lighting device according to claim 1, wherein the mode selection unit is configured to select the rated mode and the detection mode alternately immediately after a lighting signal is inputted from an outside source, and determine periods for the rated mode and the detection mode with which the organic EL light-emitting element emits light at a predetermined luminance.

8. The light-emitting element lighting device according to claim 1, wherein the mode selection unit is configured to select the detection mode when the voltage across both ends in the rated mode is lower than or equal to a predetermined voltage which is lower than the rated voltage.

9. The light-emitting element lighting device according to claim 1, wherein the mode selection unit is configured to select the rated mode and the detection mode alternately when the voltage across both ends in the rated mode is lower than or equal to a predetermined voltage which is lower than the rated voltage.

10. The light-emitting element lighting device according to claim 1, wherein the current control unit is configured to cause the current generation unit to stop outputting a current to a light-emitting module which includes the organic EL light-emitting element singularly or in a plurality connected in series, when, in the detection mode which is set in a transient period in which a current transitions from a current smaller than the rated current to the rated current, a voltage across both ends of the light-emitting module which is detected at a predetermined time in the transient period is lower than or equal to the abnormality detection threshold voltage which is set lower than a sum rated voltage which is a sum of rated voltages at a time when organic EL light-emitting elements included in the light-emitting module are turned ON.

11. The light-emitting element lighting device according to claim 10, wherein the mode selection unit is configured to select the detection mode at least once in a period in which the light-emitting module is continuously turned ON.

12. The light-emitting element lighting device according to claim 10, wherein the mode selection unit is configured to select the detection period for a predetermined period, immediately after power supply is provided.

13. The light-emitting element lighting device according to claim 10, wherein the current control unit is configured to shorten a period from a start time of the transient period up to the predetermined time, as the number of the organic EL light-emitting elements included in the light-emitting module is higher.

14. The light-emitting element lighting device according to claim 10, wherein the current control unit is configured to set the abnormality detection threshold voltage higher as the number of the organic EL light-emitting elements included in the light-emitting module is higher.

15. A light-emitting module comprising:

an organic EL light-emitting element; and the light-emitting element lighting device according to claim 1.

16. An illuminating apparatus comprising a plurality of the light-emitting modules according to claim 15.

17. A lighting method for turning ON an organic EL light-emitting element, the lighting method comprising:

selecting one of (i) a rated mode for passing a rated current for turning ON the organic EL light-emitting element and (ii) a detection mode for passing an abnormality detection current, which is smaller than the rated current, for detecting an abnormality in the organic EL light-emitting element;

detecting a voltage across both ends of the organic EL light-emitting element; and causing output of current to the organic EL light-emitting element to stop, when the voltage across both ends detected in the detecting in the detection mode is lower than or equal to an abnormality detection threshold voltage which is set lower than the rated voltage at a time when the organic EL light-emitting element is turned ON, wherein, in the selecting, the rated mode and the detection mode are selected alternately.

* * * * *